US011167915B1

(12) United States Patent
Ford, III

(10) Patent No.: US 11,167,915 B1
(45) Date of Patent: Nov. 9, 2021

(54) MULTIPURPOSE RELOCATABLE STRUCTURE AND LIFTING SYSTEMS AND METHODS

(71) Applicant: Irish Dawg Industries, LLC, Stuart, FL (US)

(72) Inventor: Harry Ralph Ford, III, Stuart, FL (US)

(73) Assignee: IRISH DAWG INDUSTRIES, LLC, Stuart, FL (US)

( * ) Notice: Subject to any disclaimer, the term of this patent is extended or adjusted under 35 U.S.C. 154(b) by 0 days.

(21) Appl. No.: 17/214,063

(22) Filed: Mar. 26, 2021

(51) Int. Cl.
| | |
|---|---|
| *B65D 88/12* | (2006.01) |
| *B65D 88/74* | (2006.01) |
| *B65D 90/00* | (2006.01) |
| *B65D 90/10* | (2006.01) |
| *H01M 50/20* | (2021.01) |
| *E04H 1/12* | (2006.01) |
| *H02B 1/26* | (2006.01) |

(52) U.S. Cl.
CPC ......... *B65D 88/121* (2013.01); *B65D 88/745* (2013.01); *B65D 90/008* (2013.01); *B65D 90/10* (2013.01); *H01M 50/20* (2021.01); *E04H 2001/1283* (2013.01); *H02B 1/26* (2013.01)

(58) Field of Classification Search
CPC .. B65D 88/121; B65D 88/745; B65D 90/008; B65D 90/10; B65D 90/00; H01M 50/20; E04H 2001/1283; E04H 1/12; H02B 1/26
See application file for complete search history.

(56) References Cited

U.S. PATENT DOCUMENTS

| | | | |
|---|---|---|---|
| 2,499,498 | A | 3/1950 | Hammond, Jr. |
| 3,553,823 | A | 1/1971 | Alfredsson |
| 3,623,296 | A | 11/1971 | Santoro |
| 3,754,516 | A | 8/1973 | Van |
| 3,963,290 | A | 6/1976 | Rennemann |
| 4,049,149 | A | 9/1977 | Durenec |
| 4,305,505 | A | 12/1981 | Hickey |
| 4,521,941 | A | 6/1985 | Gerhard |
| 4,766,708 | A | 8/1988 | Sing |
| 4,875,814 | A | 10/1989 | Weller |
| 5,072,845 | A | 12/1991 | Grogan |
| 5,171,113 | A | 12/1992 | Hove |

(Continued)

FOREIGN PATENT DOCUMENTS

| | | |
|---|---|---|
| CA | 2854516 | 5/2015 |
| DE | 202013012030 U1 | 12/2014 |

(Continued)

OTHER PUBLICATIONS

Office Action, dated Apr. 5, 2021, from corresponding U.S. Appl. No. 16/824,941.

(Continued)

*Primary Examiner* — Robert L Deberadinis
(74) *Attorney, Agent, or Firm* — Brient IP Law, LLC

(57) ABSTRACT

A multipurpose relocatable structure includes a floor system, a framework secured to the floor system, and walls coupled to the framework. The walls include a number of panels that are secured along adjacent vertical edges. The multipurpose relocatable structure may include a preconfigured interior, one or more doors having an emergency escape hatch, a protected electrical connector, an environmental control (Continued)

system that is configurable between operational and transport configurations, and lifting corners having securement apertures.

20 Claims, 25 Drawing Sheets

(56) References Cited

U.S. PATENT DOCUMENTS

| | | | |
|---|---|---|---|
| 6,105,511 | A | 8/2000 | Bridges |
| 6,220,468 | B1 | 4/2001 | Lee |
| 7,185,779 | B2 | 3/2007 | Payne |
| 7,507,061 | B2 | 3/2009 | Wells et al. |
| 7,823,338 | B2 | 11/2010 | Slagel et al. |
| 8,066,134 | B2 | 11/2011 | Davidson |
| 8,556,112 | B2 | 10/2013 | Tujague, Sr. et al. |
| 8,763,314 | B2 | 7/2014 | Hyeup |
| 8,881,934 | B2 | 11/2014 | Tujague, Sr. et al. |
| 9,422,083 | B1 | 8/2016 | Embleton et al. |
| 9,499,334 | B2 | 11/2016 | Disorbo |
| 9,617,748 | B2 | 4/2017 | Wilson et al. |
| 9,966,739 | B2 | 5/2018 | Chen et al. |
| 10,340,697 | B2 | 7/2019 | Paine et al. |
| 10,549,908 | B2 | 2/2020 | Kochanowski |
| 10,865,040 | B2 | 12/2020 | Oltman et al. |
| 2005/0193643 | A1 | 9/2005 | Pettus |
| 2009/0084800 | A1 | 4/2009 | Hartley et al. |
| 2018/0050862 | A1 | 2/2018 | Wu et al. |
| 2018/0237216 | A1 | 8/2018 | Saer |

FOREIGN PATENT DOCUMENTS

| | | |
|---|---|---|
| DE | 102017111609 B3 | 10/2018 |
| FR | 1291776 A | 4/1962 |
| GB | 2415444 A | 12/2005 |
| WO | 2009105050 A1 | 8/2009 |
| WO | 2014128120 A2 | 8/2014 |

OTHER PUBLICATIONS

Notice of Allowance, dated Mar. 19, 2021, from corresponding U.S. Appl. No. 16/824,952.
Office Action, dated Nov. 13, 2020, from corresponding U.S. Appl. No. 16/824,952.
Office Action, dated Nov. 9, 2020, from corresponding U.S. Appl. No. 16/824,945.
Office Action, dated Oct. 29, 2020, from corresponding U.S. Appl. No. 16/824,941.
Restriction Requirement, dated Aug. 7, 2020, from corresponding U.S. Appl. No. 16/824,945.
Restriction Requirement, dated Jul. 2, 2020, from corresponding U.S. Appl. No. 16/824,952.
Restriction Requirement, dated May 29, 2020, from corresponding U.S. Appl. No. 16/824,941.
Office Action, dated Jul. 14, 2021, from corresponding U.S. Appl. No. 17/214,050.

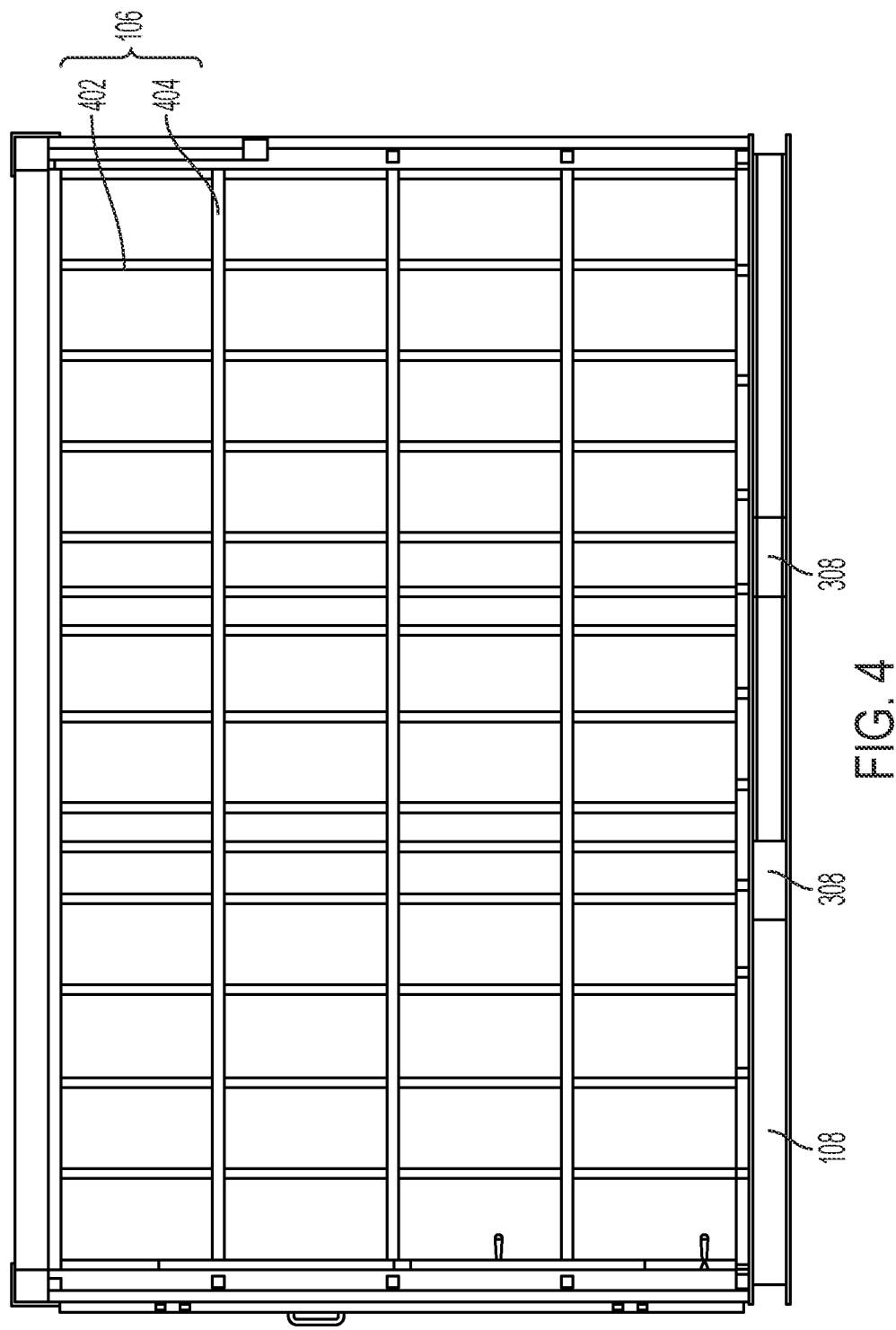

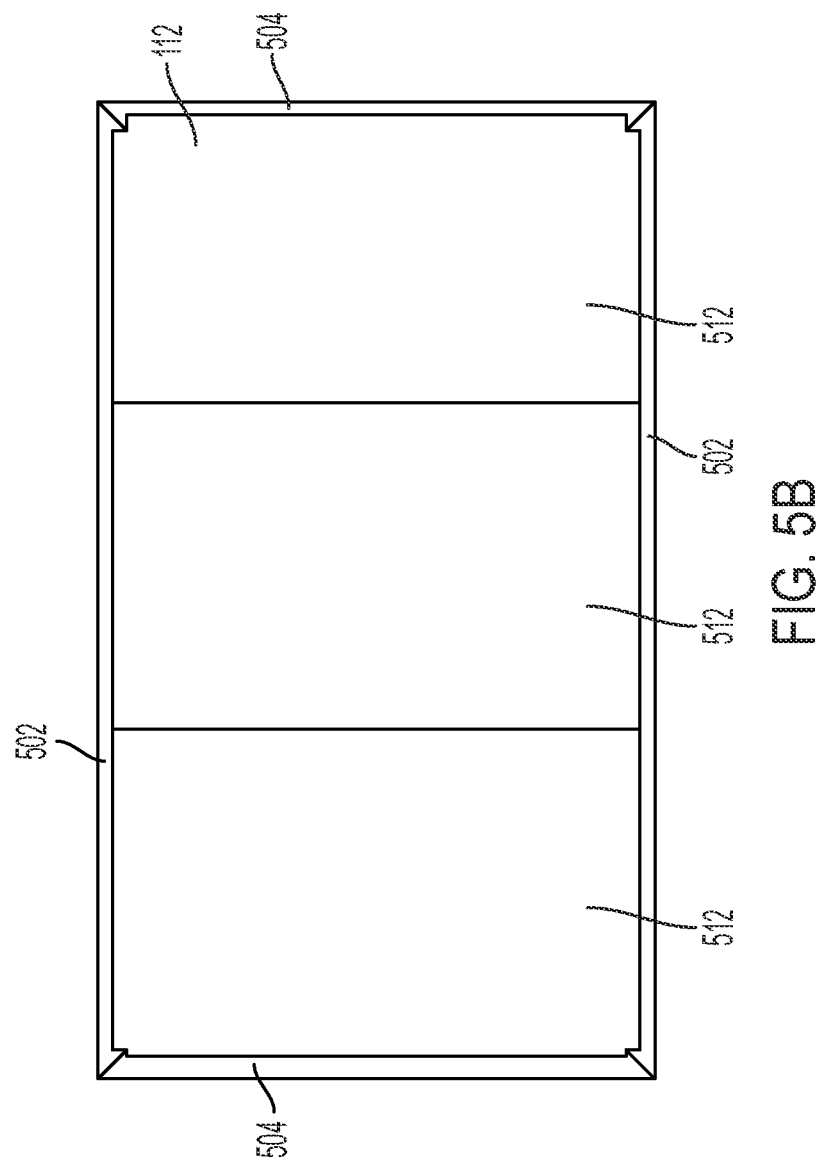

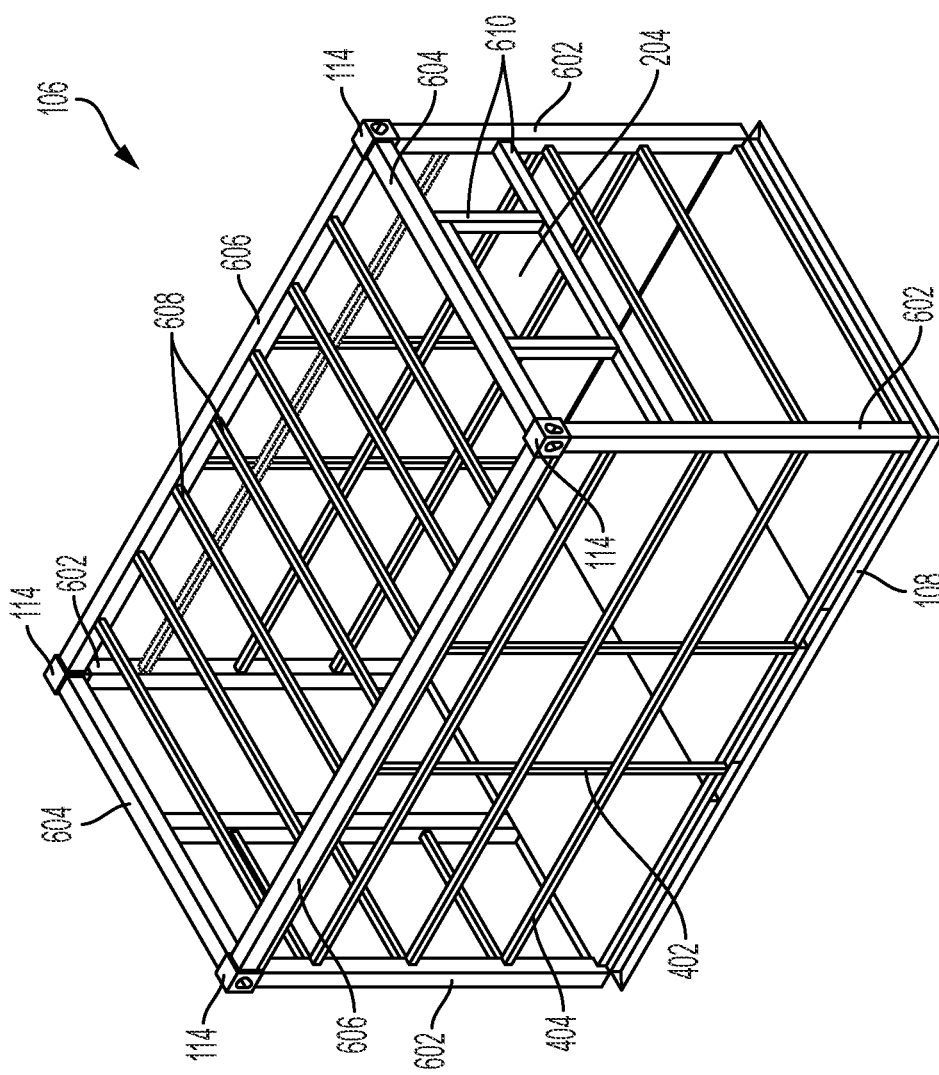

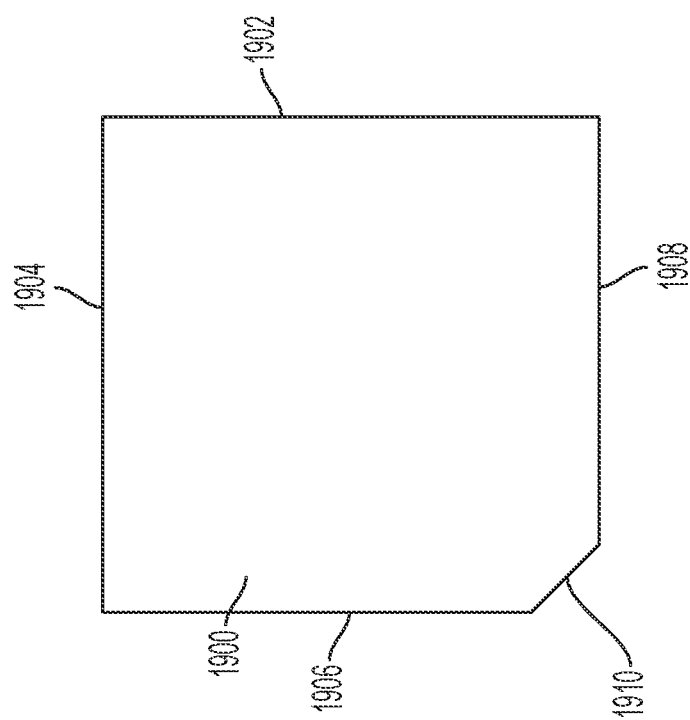
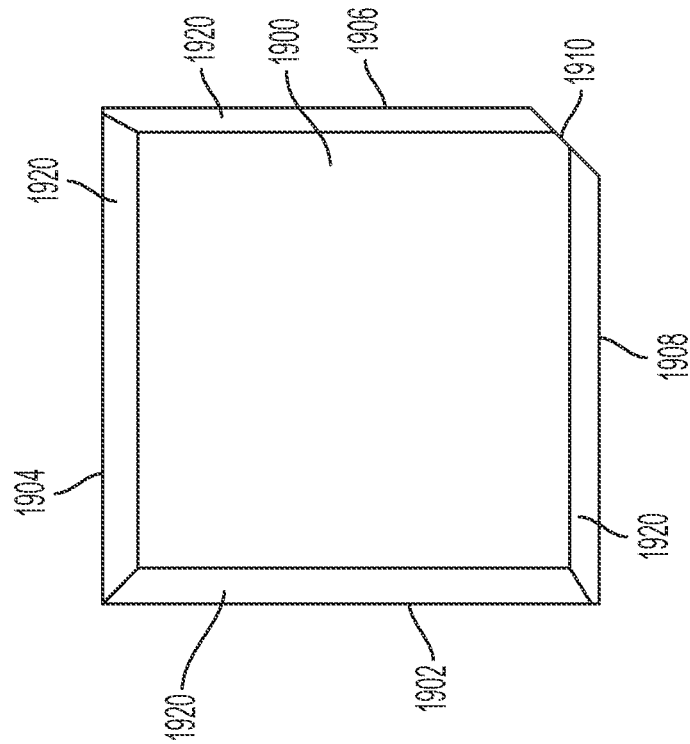
FIG. 19B
FIG. 19A

MULTIPURPOSE RELOCATABLE STRUCTURE AND LIFTING SYSTEMS AND METHODS

BACKGROUND

Standardized shipping containers are commonly used throughout the world for shipping goods and cargo. These containers are referred to as ISO (International Organization for Standardization) containers, and intermodal freight containers, among other names. Shipping containers are typically configured in standard sizes, including 10 feet, 20 feet, and 40 feet in length.

Military use of containers is common and often a critical component of fast and efficient mobilization, as well as of sustained operations at deployed locations. There is a need for military, humanitarian, and other organizations to be able to ship equipment all over the world by sea, land, and rail, and to use these containers and the equipment within to set up mobile or temporary operations quickly and effectively. Military and commercial users have therefore adapted the ISO container for uses beyond storage. However, this design is limited by its dimensions, specialized lifting and moving requirements, and especially in the military context, the price of ISO-derivative designs. There is a need for a reasonably price mobile structure in a size between the ISO 10 and 20-foot container footprint that is pre-configurable for virtually any use and easily deployable.

Various embodiments of the present multipurpose relocatable structure and methods recognize and address the foregoing considerations, and others, of prior art devices.

SUMMARY

It should be appreciated that this Summary is provided to introduce a selection of concepts in a simplified form that are further described below in the Detailed Description. This Summary is not intended to be used to limit the scope of the claimed subject matter.

According to one aspect of the disclosure, a multipurpose relocatable structure includes a floor system, a framework secured to the floor system, a ceiling pan, and walls secured to the framework. The framework includes a number of corner posts, a pair of upper end posts, a pair of upper side posts, a number of horizontal support members positioned between the corner posts, a number of vertical support members traversing the horizontal support members between the upper side posts and the floor system, and a number of ceiling supports positioned between the pair of upper side posts or the pair of upper end posts. The ceiling pan is secured to the ceiling supports. Each wall includes a number of panels, with each panel secured to at least one adjacent panel along a vertical edge.

According to another aspect, a multipurpose relocatable structure includes a floor system, a framework secured to the floor system, a ceiling pan secured to the framework, and walls secured to the framework. Each wall includes a number of panels. Each panel is secured to at least one adjacent panel along a vertical edge. A door is positioned in an end wall and includes an access hole sized to allow a person to egress through the access hole. An emergency escape hatch is positioned within the access hole of the door, the emergency escape hatch being releasable from an interior of the multipurpose relocatable structure and configured to be pushed outward to an exterior of the multipurpose relocatable structure after being released. A protected electrical connector is configured to receive an external electrical connector from an external power source and to provide electricity to an internal circuit breaker. The protected electrical connector is positioned within a wall between a plane defined by an external surface of the wall and the interior of the multipurpose relocatable structure.

According to yet another aspect of the disclosure, a multipurpose relocatable structure includes a framework secured to a floor system, a number of walls secured to the framework, and a protected electrical connector configured to receive an external electrical connector from an external power source and to provide electricity to an internal circuit breaker. The protected electrical connector is positioned within a wall between a plane defined by an external surface of the wall and the interior of the multipurpose relocatable structure. Each wall includes a number of panels. Each panel includes a first substantially vertical member, a first substantially horizontal member, a second substantially vertical member, and a second substantially horizontal member. The first substantially vertical member is positioned on a first edge of the panel and extends away from a substantially horizontal front face of the panel. The first substantially horizontal member extends toward a center of the panel from the first substantially vertical member to form a substantially L-shaped configuration. The second substantially vertical member is positioned on a second edge of the panel opposite the first edge and extends away from the substantially horizontal front face of the panel. The second substantially horizontal member extends away from the center of the panel from the second substantially vertical member to form a substantially backwards L-shaped configuration. The first edge of the panel is configured to nest within the second edge of an adjacent panel for coupling.

BRIEF DESCRIPTION OF THE DRAWINGS

Various embodiments of the invention will be described below. In the course of the description, reference will be made to the accompanying drawings, which are not necessarily drawn to scale, and wherein:

FIG. 4 is a cross-sectional view of the multipurpose relocatable structure of FIG. 1 according to various embodiments described below.

FIG. 5B is a top view of a floor system, including a treadplate, of a multipurpose relocatable structure according to various embodiments described below.

FIG. 6 is a perspective view of a multipurpose relocatable structure without the walls and ceiling to show the framework according to various embodiments described below.

FIGS. 19A and 19B are front and rear views, respectively, of a top face of a lifting corner of a multipurpose relocatable structure according to various embodiments described below.

DETAILED DESCRIPTION OF VARIOUS EMBODIMENTS

Figure 1:
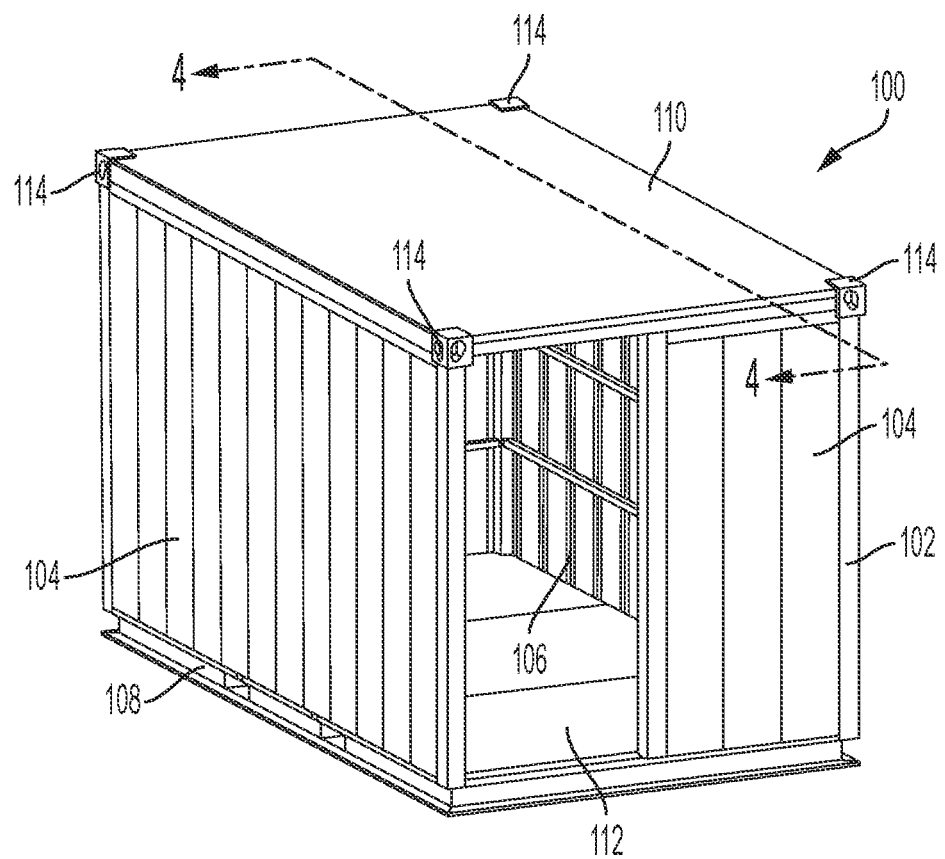
FIG. 1 is a front perspective view of a 12-foot standard version of a multipurpose relocatable structure according to various embodiments described below.

Various embodiments now will be described more fully hereinafter with reference to the accompanying drawings. It should be understood that the invention may be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

There is a need for military, humanitarian, and other organizations to efficiently establish mobile or temporary operations at deployed locations. This need is not adequately covered by conventional shipping containers, or structures designed within that footprint for the reasons articulated above. Other structures closer to the footprint of the subject structure likewise have characteristics that lessen their utility in comparison. Some conventional structures of near comparable size are not capable of being placed on the ground and must remain on the transport vehicle. Furthermore, the construction of those structures emphasizes lightweight characteristics and a less building-like structure, including a lower roof height. These characteristics impair its utility as a working space for maintenance and heavy storage and negatively impacts the utility as a building-like workspace. Furthermore, the honeycomb aluminum panels used in those structures are considered structural members. Any penetrations to the wall of the container can result in a compromise of a structural member, which requires that the container structure be deemed non-usable and non-deployable since the unit is not mission capable at the time of the damage. Given the complexity of the wall material, proper field repair can also be challenging. Even if the penetration is minor and has minimal to no effect on the structural capabilities of the container, the container may need to be shipped off station for repair. Doing so may significantly impact the mission capability of the affected military unit.

A specialized 12 foot structure fills this void, as it maximizes size without being too large to fit on internationally common transportation vehicles, and is capable of using common lifting equipment. This product is designed to be highly mobile and still retains many benefits of building-like functionality which offers a platform for multiple operational interior configurations. Interior configurations can be provided by the manufacturer as "turn-key" options and/or set up or modified by the customer using equipment on hand.

The multipurpose relocatable structure described herein can function like a robust building-like structure that offers turn key functionality either hooked up to an electrical source from a building, or to a generator, most anywhere in the world with minimal set up time. Due to its more expansive height and overall building-like design, the structure can function like a small facility for use as command, operations, communications, and mobile meeting spaces. Due to its heavyweight and more building-like design, it can be configured to accommodate the heavy equipment necessary for various mobile maintenance applications. Because it can be picked up and removed from the vehicle for operation, it can also house activities that due to hazards or other concerns need to be separated from permanent structures, or need to move around to supply the function in various locations for optimal efficiency. Its utility is equally broad in the civilian world, offering almost limitless options as a mobile structure in multiple fields from medical, construction, film, disaster relief, oil and gas exploration, industrial sitework or maintenance, to remote equipment and supplies housing and movement.

The multipurpose relocatable structures described herein include two primary structural configurations, although the interiors of both may be configured in any desirable manner to accommodate the intended mission of the structure. According to one embodiment, the multipurpose relocatable structure will be referred to as a 12-foot structure. One embodiment of the 12-foot structure includes dimensions that are approximately 82 inches wide, 96 inches high, and 144 inches long. According to another embodiment described in greater detail below, the multipurpose relocatable structure will be referred to as a 12-foot "shorty" structure. The shorty is approximately 82 inches wide, 88 inches high, and 144 inches long Generally, embodiments of the 12-foot structure include configuring the structure as a facility according to a particular purpose or mission. Because of the reduced height of the shorty structure, the shorty structure is particularly desirable when configured for equipment or material storage, or for a particular equipment purpose or mission (e.g., battery charging and storage). The shorty structure is sized for insertion into standard ISO containers (1EE or 1CC under the ISO 668 classification), for shipment, or may alternatively be shipped independently as they possess the structural components and associated capabilities with lifting corners, as described in detail below. Except where otherwise specified, the embodiments described herein are applicable to both the 12-foot and the shorty structure embodiments.

The multipurpose relocatable structure described herein is not configured to fit inside of a conventional size container (1EE or 1CC under the ISO 668 classification), although it is designed so it can fit into a high cube container (1AAA or 1BBB under the ISO 668 classification), or a flat rack for overseas transport. It is also capable of being transported by itself via any suitably sized and rated commercial motor vehicle, as well as train, with minimal preparation. It also has the dimensions to be moved by aircraft. Some buildouts can be operated still attached to a (parked) FMTV or commercial trailer without being disengaged.

The shorty multipurpose relocatable structure shares some of the design features of its larger cousin, but differs in its mobility options. Its width and height are the same, but it is shorter to accommodate shipment in a conventional 20 or 40 foot intermodal shipping container (1EE or 1CC under the ISO 668 classification). This product is generally not designed to be conditioned occupiable space (although it is still a structure that houses the equipment securely from the elements). It is also more of an industrial structure. It is hallmarked by a strong frame, multiple doors and easily accessible spaces. This product design can still facilitate a number of operational functions within the military (and the civilian side). Its dimensions allow it to be placed and carried inside of an ISO container anywhere in the world with very little expertise or equipment needed, other than a properly sized forklift. This feature also increases its utility as a mobile storage structure that can be removed from the container after shipment and immediately utilized as a self-contained, pre-organized room for whatever materials it stores. In addition, the specific dimensions of both versions of the structure fit the M35 series truck without alteration of the vehicle. Specifically, troop seats lining the bed of the truck need not be removed and stored, like with conventional designs.

Each version of this structure also has incorporated into its design four lift and tie down points, facilitating securing the structure for loading without the need for separate equipment or hardware (other than the chains or other tie downs). These same corner points are designed to facilitate the lifting and movement of the structure when all four points are used. Along with forklift pockets on multiple sides, the structure has built in two methods to move the structure when desired.

Utilizing the concepts and techniques described herein, a multipurpose relocatable structure provides a structure that is deployable via almost limitless types of vehicles using the same standardized hardware for securing the structure, lifting corners and forklift pockets that facilitate lifting and securing the structure without external components that are prone to damage, an infrastructure and wall panel configuration and dimensions that provides increased load capacity and building like functionality over structures of similar size, and an overall design and dimensions that facilitate much greater utility due to its operational interior options.

Turning now to FIG. 1, a multipurpose relocatable structure 100 is shown. According to one embodiment, the multipurpose relocatable structure 100 is a 12-foot multipurpose relocatable structure 102 (or 12-foot structure 102). According to another embodiment discussed briefly above and described in greater detail below with respect to FIGS. 9A-9F, the multipurpose relocatable structure 100 includes a 12-foot "shorty" structure. Generally, embodiments of the 12-foot structure 102 include configuring the structure as a facility according to a particular purpose or mission. Because of the reduced height of the shorty structure described below, the shorty structure is typically configured for equipment or material storage, or for a particular equipment purpose or mission (e.g., battery charging and storage). The shorty structure is sized for insertion into standard ISO containers for shipment, or may alternatively be shipped independently as they possess the structural components and associated capabilities with lifting corners, as described in detail below. Except where otherwise specified, the embodiments described herein are applicable to both the 12-foot and the shorty structure embodiments.

The multipurpose relocatable structure 100 includes walls 104 supported by a framework 106, a floor system 108 (including a treadplate 112), and ceiling 110. Lifting corners 114 provide a mechanism for lifting the 12-foot structure 102, which can also be used to tie down or secure the 12-foot structure 102 in a vehicle. The multipurpose relocatable structure 100 is shown without an end door so that the interior may be seen. According to various embodiments, the 12-foot structure 102 may include one or more end doors positioned on a front side of the structure and/or one or more side doors positioned on one or more sides of the structure. These doors are shown and described below with respect to FIGS. 3 and 9.

Figure 2:
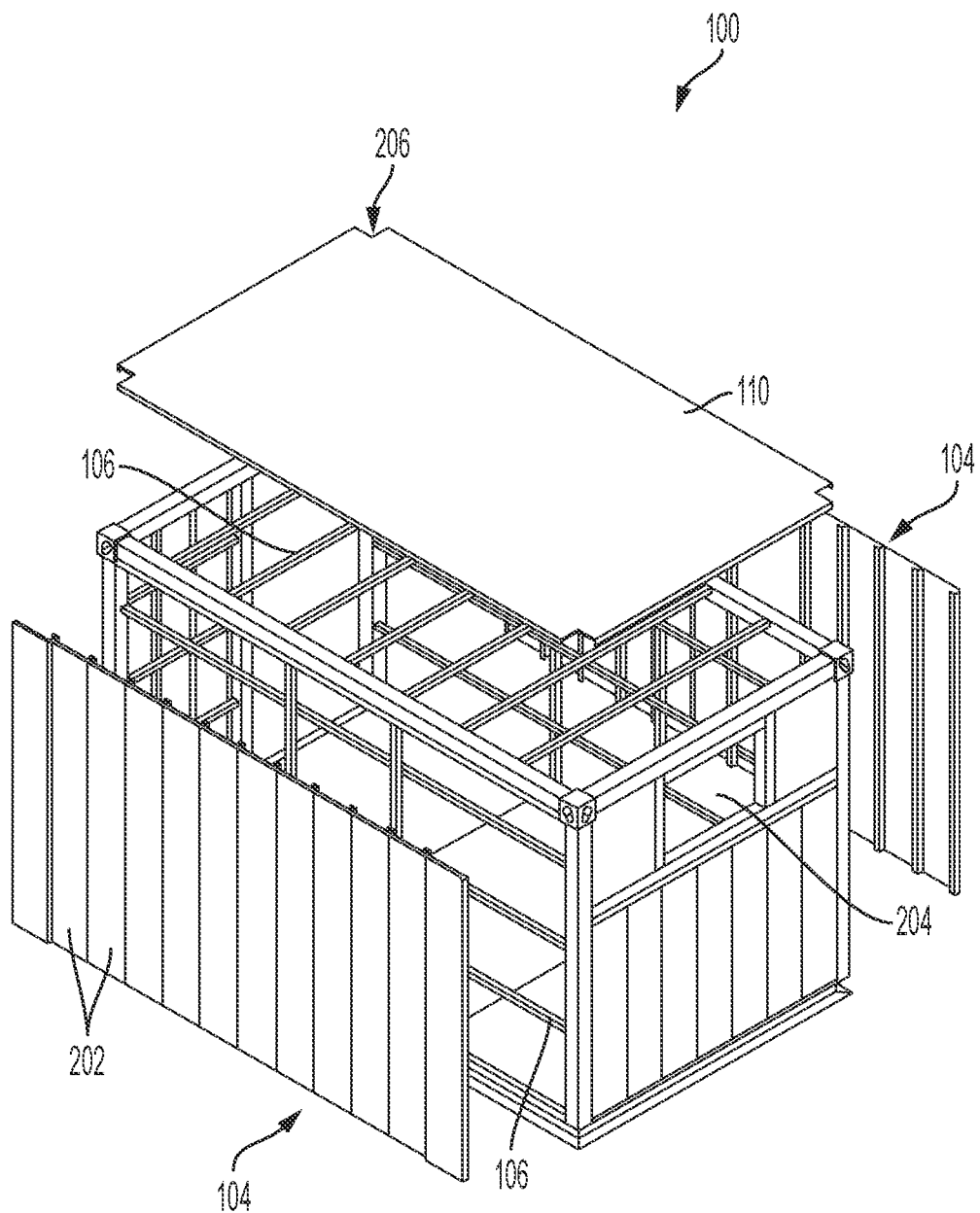
FIG. 2 is an exploded rear perspective view of a 12-foot standard version of a multipurpose relocatable structure according to various embodiments described below.

FIG. 2 shows an exploded rear perspective view of the multipurpose relocatable structure 100. The multipurpose relocatable structure 100 includes a framework 106 made up of a number of horizontal and vertical supports extending between larger corner and edge beams. The details of this framework 106 will be discussed in greater detail below with respect to FIGS. 4 and 6. Walls 104 are supported on the vertical portions of the framework 106, with a ceiling pan 110 positioned on top. The ceiling pan 110 may be manufactured from a single piece of material, or may alternatively be manufactured from two or more ceiling panels that are secured adjacent to and abutting one another to create the ceiling pan 110. To weatherproof the structure, the adjacent ceiling panels may be welded along a seam or otherwise sealed. The ceiling pan 110 is shown as a single piece of material, which is preferable to ensure weatherproofing. According to one embodiment, the ceiling pan 110 is manufactured from 10-gauge steel. Any suitable gauge metal may be utilized without departing from the scope of this disclosure, provided that it supplies sufficient structural support to meet or exceed the requirement that it withstand a snow load of approximately 40 lb/ft2 (200 kg/m2) and a personnel load of approximately 660 lb (300 kg) static over approximately 2 ft2 (0.2 m2). As seen in FIG. 2, the ceiling pan 110 may have corner notches 206 to accommodate the lifting corners 114.

The walls 104 are made up of a number of parallel, adjacent panels 202. The panels 202 are welded or otherwise secured to one another to form the walls 104 of appropriate dimensions to cover the vertical portions of the framework 106. The framework 106 provides all of the structural support for the 12-foot structure 102 without the panels 202. For this reason, and because the walls 103 are made up of panels 202, any damage to or penetration of a wall 104 does not structurally impair the multipurpose relocatable structure 100 or require the multipurpose relocatable structure 100 to be shipped off station for repair as is required with conventional structures. Rather, if a wall 104 is penetrated and repair is desired, repair merely entails patching of a panel 202, which can be done on-site.

Figure 7B:
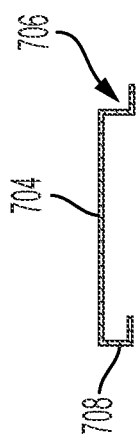
FIGS. 7A and 7B show perspective and cross-sectional views, respectively, of a first wall panel configuration according to various embodiments described below.
Figure 7A:
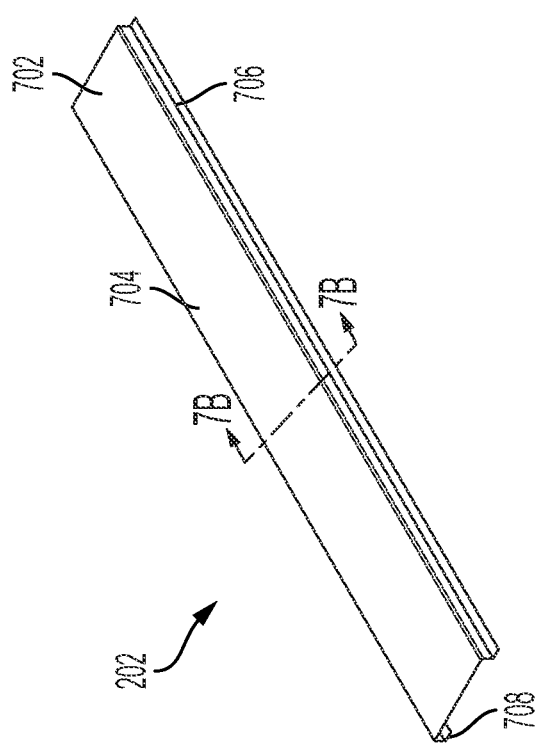

Turning to FIGS. 7A-8B, two configurations of the panels 202 will now be described. FIG. 7A shows a panel 202 according to a first configuration 702. In this example, the panel 202 includes a front face 704, a first side 706, and a second side 708 opposite the first side. FIG. 7B shows a cross section of the panel 202 of FIG. 7A. As seen in the cross section, the first side 706 and the second side 708 of this first configuration 702 each have a generally vertical member extending downward from the front face 704 and a generally horizontal member extending to the right from the generally vertical member to form a substantially "L-shaped" configuration. In doing so, the second side 708 of one panel 202 may nest within the first side 706 of an adjacent panel 202, similar to a tongue and groove arrangement. The adjacent panels 202 may then be welded or otherwise fastened together, repeating the process for additional adjacent panels 202 until the wall 104 is complete. The interlocking configuration of the panels 202 increases the structural integrity of the multipurpose relocatable structure 100, specifically providing improved capabilities to carry large compressive loads.

Figure 8B:
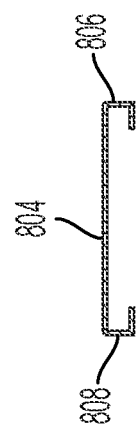
FIGS. 8A and 8B show perspective and cross-sectional views, respectively, of a second wall panel configuration according to various embodiments described below.
Figure 8A:
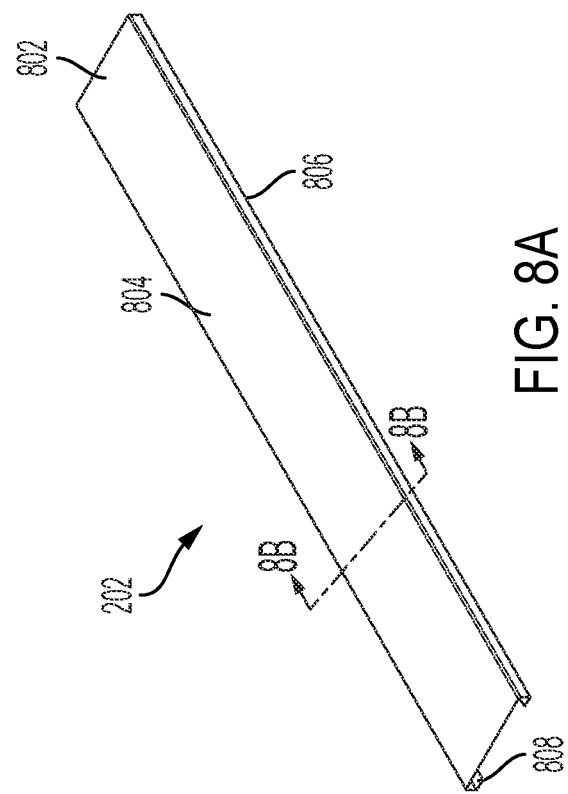

FIGS. 8A and 8B show a panel 202 and cross-sectional view of the panel 202, respectively, according to a second configuration 802. In this example, the panel 202 includes a front face 804, a first side 806, and a second side 808 opposite the first side. As seen in the cross section of FIG. 8B, the first side 806 and the second side 808 of this second configuration 802 are mirror images of one another. Specifically, the first side 806 has a generally vertical member extending downward from the front face 804 and a generally horizontal member extending to the left from the generally vertical member to form a substantially backwards "L-shaped" configuration. The second side 808 has a generally vertical member extending downward from the front face 804 and a generally horizontal member extending to the right from the generally vertical member to form a substantially "L-shaped" configuration. In doing so, the vertically oriented members of the first and second sides of adjacent panels 202 may abut. The adjacent panels 202 may then be welded or otherwise fastened together, repeating the process for additional adjacent panels 202 until the wall 104 is complete. According to one embodiment, the panels 202 may comprise 14-gauge steel, although any suitable gauge or suitable material may be used without departing from the scope of this disclosure.

Figure 3C:
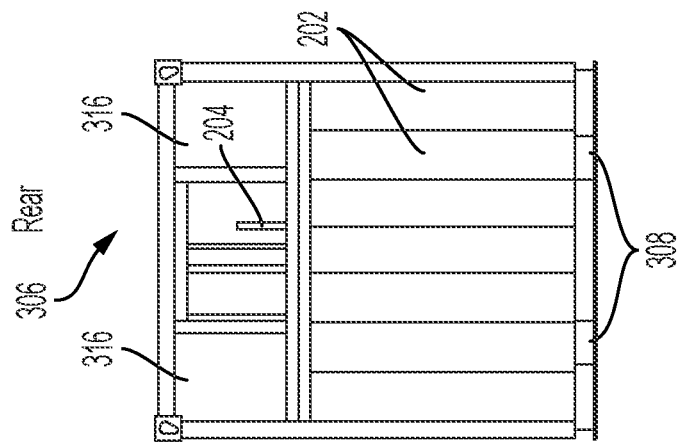
FIGS. 3A, 3B, and 3C show side, front, and rear views, respectively, of a 12-foot standard version of a multipurpose relocatable structure according to various embodiments described below.

Returning now to FIGS. 3A-3C, a structure side 302, a structure front 304, and a structure rear 306, respectively, of the multipurpose relocatable structure 100 will be discussed. The multipurpose relocatable structure 100 of FIGS. 3A-3C may represent a 12-foot structure that may be configured as a facility with any type of internal configuration desired according to a designated mission for the structure. FIG. 3A shows a structure side 302 according to one embodiment. The side view shows panels 202 coupled together to create the side wall. The floor system 108 can also be seen at the bottom of the structure. The floor system 108 may include forklift apertures 308 that facilitate movement of the multipurpose relocatable structure 100 by forklift. The structure side 302 shown in FIG. 3A shows only one side. The multipurpose relocatable structure 100 has an opposite side that may be a mirror image or the structure side 302 that is shown in FIG. 3A.

Figure 3B:
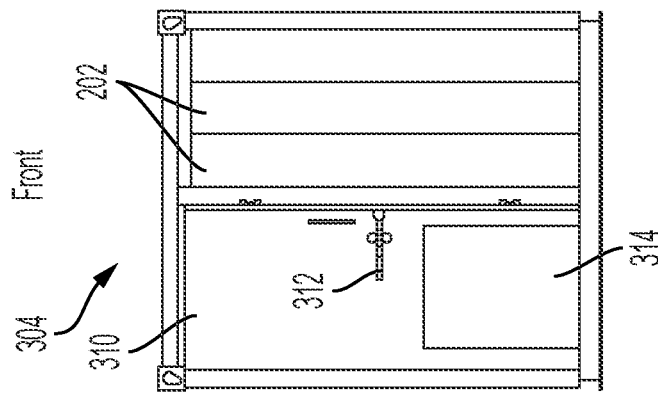
Figure 3A:
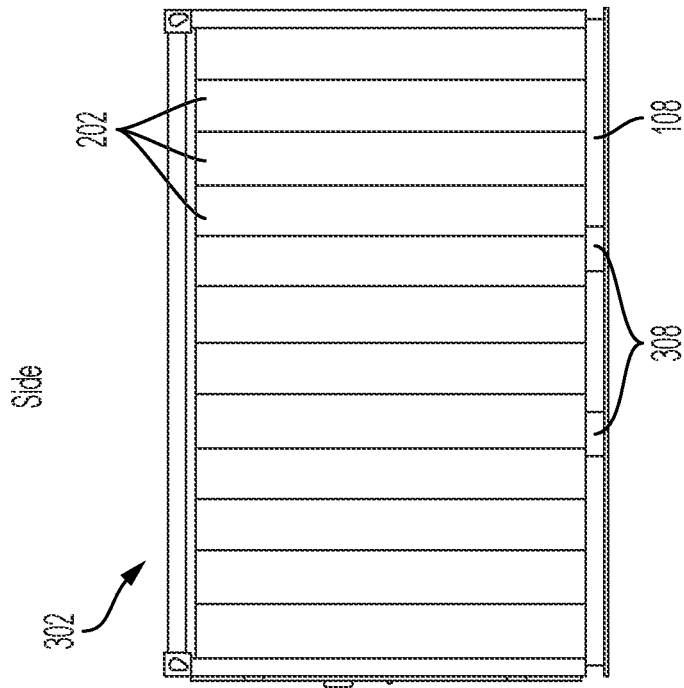

FIG. 3B shows a structure front 304 according to one embodiment. The structure front 304 includes panels 202 that are coupled together to create a front wall adjacent to or around a door 310. The door 310 includes a door latch 312 that is operative to selectively secure and unsecure the door 310 upon rotating the handle upwards and downward. And appropriate door latch 312 may be used without departing from the scope of this disclosure. The door 310 may include an emergency escape hatch 314, which will be described in greater detail with respect to FIGS. 10-12.

FIG. 3C shows a structure rear 306 that according to this particular embodiment, has an environmental control unit (ECU) opening 204. The ECU opening 204 is sized to receive an ECU for conditioning the air inside the structure. One or more rear upper panels 316 fill the space adjacent to or surrounding the ECU opening 204. Panels 202 are coupled together to create a lower wall below the ECU opening 204. It should be appreciated that the ECU opening 204 may be positioned at any location within the structure rear 306, or alternatively within a structure side 302 or the structure front 304. The floor system 108 may include forklift apertures 308 that are accessible from the structure rear 306 that facilitate movement of the multipurpose relocatable structure 100 by forklift. Various embodiments provide for forklift apertures 308 accessible from the structure front 304 and/or the structure rear 306, as well as from the structure sides 302. By doing so, the multipurpose relocatable structure 100 provides for easy loading and unloading to and from any type of vehicle and placement in the operating position at the deployed location.

FIG. 4 shows a cross-sectional view of a multipurpose relocatable structure 100 taken along lines 4-4 of FIG. 1. The cross-sectional view shows the framework 106 that provides the structural support for the multipurpose relocatable structure 100 and for mounting the panels 202 that create the walls 104. The framework 106 includes a number of vertical support members 402 and a number of horizontal support members 404. The number, spacing, and characteristics of the vertical and horizontal support members 402 and 404 may be determined according to the structural requirements of the multipurpose relocatable structure 100 to satisfy any given mission requirements. According to one embodiment, the vertical support members 402 and the horizontal support members 404 each comprise 14 gauge, 1.5 inch square steel tubing, with the horizontal support members 404 spaced approximately 20 inches apart.

Figure 5A:
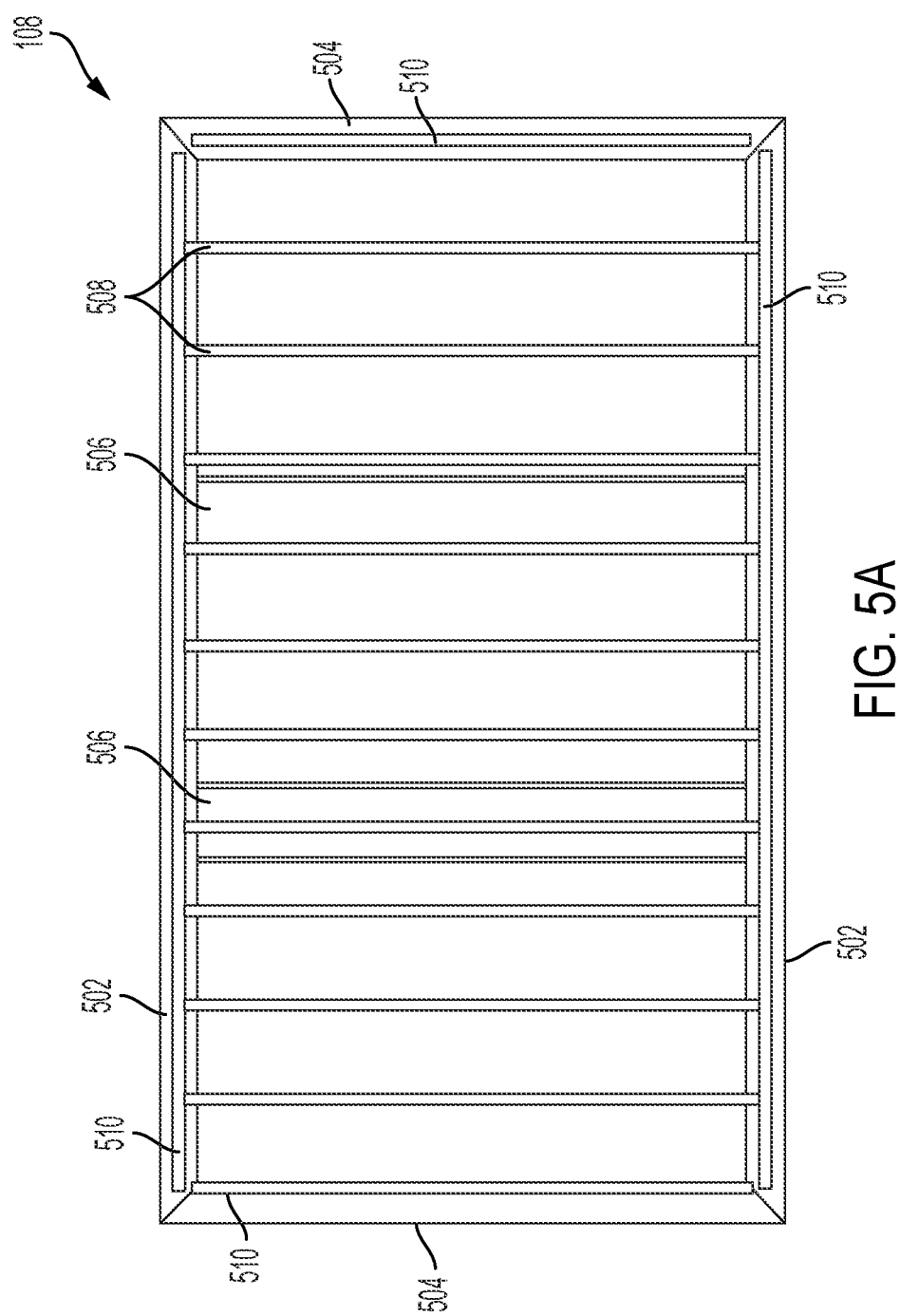
FIG. 5A is a top view of a floor system of a multipurpose relocatable structure according to various embodiments described below.

FIG. 5A shows a top view of a floor system 108 without the treadplate 112 installed. FIG. 5B shows the same view with the treadplate 112 installed. As seen in FIG. 5A, according to one embodiment, the floor system 108 includes side beams 502 and end beams 504 configured in a generally rectangular configuration. Side beams 502 and end beams 504 may be steel I-beams, or wide-flanged or W-beams. The floor system 108 additionally includes at least two tubes or conduits 506 with substantially rectangular cross-sections to provide the forklift apertures 308 for moving the multipurpose relocatable structure 100.

While the term "forklift apertures" is used herein, it should be appreciated that the conduits 506 and corresponding apertures 308 may have any suitable cross-sectional shape configured to receive tines of a forklift or other corresponding portions of any type of transfer vehicle for engaging with the multipurpose relocatable structure 100 for lifting or relocation. The forklift apertures 308 are accessible through the side beams 502 via apertures cut or otherwise created in the side beams 502. Alternatively, the side beams 502, may be formed from three separate beam sections welded or coupled together to allow for the conduits 506 that create the forklift apertures 308. According to other embodiments (e.g., as shown in FIG. 3C), alternative or additional conduits 506 may be used to create forklift apertures 308 in the end beams 504 in the same manner as described above with respect to the forklift apertures 308 formed in the side beams 502.

As seen in FIG. 5A, treadplate support members 508 (e.g., tubing manufactured from steel, other metal, polymer, and/or composite material) are arranged in parallel rows across the floor system 108. The treadplate support members 508 are welded or otherwise coupled to side beams 502. Perimeter treadplate support members 510 are similarly secured to the treadplate support members 508 and the side beams 502. The treadplate support members 508 and the perimeter treadplate support members 510 provide support for the treadplate 112. The number and orientation of the treadplate support members are not intended to limit the scope of this disclosure. Rather, any components or structural members may be used to support the treadplate 112. According to one embodiment, the treadplate support members 508 comprise 1.5 inch square steel tubing, with the treadplate support members 508 spaced approximately 9.5-13 inches apart. The perimeter treadplate support members 510 may be generally "L-shaped" and manufactured from 14-gauge steel.

FIG. 5B shows the floor system 108 with the treadplate 112 in place on the treadplate support members 508 and the perimeter treadplate support members 510. The treadplate 112 may be manufactured from a single plate of material, or in multiple plates 512 as shown in FIG. 5B. The treadplate 112 may be secured to the treadplate support members 508 and the perimeter treadplate support members 510 via welds, fasteners, or any suitable type of mechanism for permanently or removably mounting the treadplate 112. According to one embodiment, the treadplate 112 is made from 10-gauge steel.

FIG. 6 is a rear perspective view of a multipurpose relocatable structure 100 without the walls and ceiling to show the framework 106 according to various embodiments. The framework includes corner posts 602, upper end posts 604, and upper side posts 606. The corner posts 602, upper end posts 604, and upper side posts 606 are coupled together via welds or other fastening mechanisms at the lifting corners 114. The corner posts 602 are secured to the floor system 108, specifically to the side beams 502 and end beams 504. According to one embodiment, the side beams 502 and end beams 504 are made from 5@16 wide flange steel. According to another embodiment, the side beams 502 and end beams 504 are made from 10-gauge, 4-inch square steel tubing. The tubing 610 surrounding the ECU opening 204 may be manufactured from 10-gauge, 3-inch square steel tubing. Ceiling supports 608 may be 14 gauge, 1.5 inch square steel tubing, spaced approximately 16 inches apart.

FIGS. 9A-9F show various views of a multipurpose relocatable structure 100 according to various embodiments. The multipurpose relocatable structure 100 of FIGS. 9A-9F may be a shorty structure 902 as described above. In this example, the multipurpose relocatable structure 100 may be configured as a battery charging and maintenance structure. It should be appreciated that although the multipurpose relocatable structure 100 is shown and described as a battery charging and maintenance structure, the structures may be configured in virtually endless configurations according to the desired use. Such configurations include, but are not limited to, petroleum oil and lubricant storage and maintenance, glycol recycling and/or generation, milling and machining, fabrication and welding shop, small arms repair, hydraulic fabrication and repair, mobile water treatment, a mobile solar power facility, and a general maintenance facility.

Figure 9A:
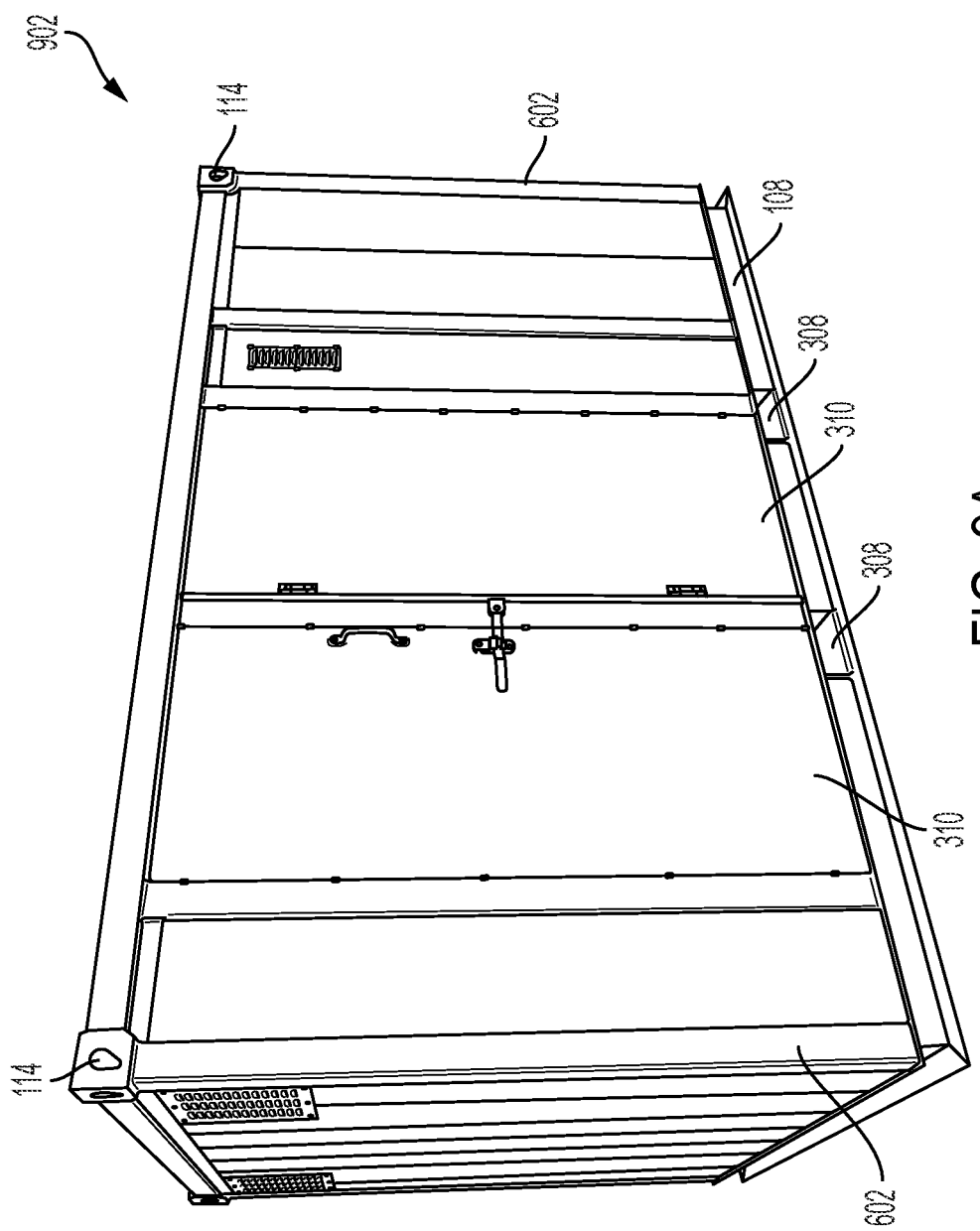
FIG. 9A is a perspective view of a shorty version of a multipurpose relocatable structure with side doors closed according to various embodiments described below.
Figure 9B:
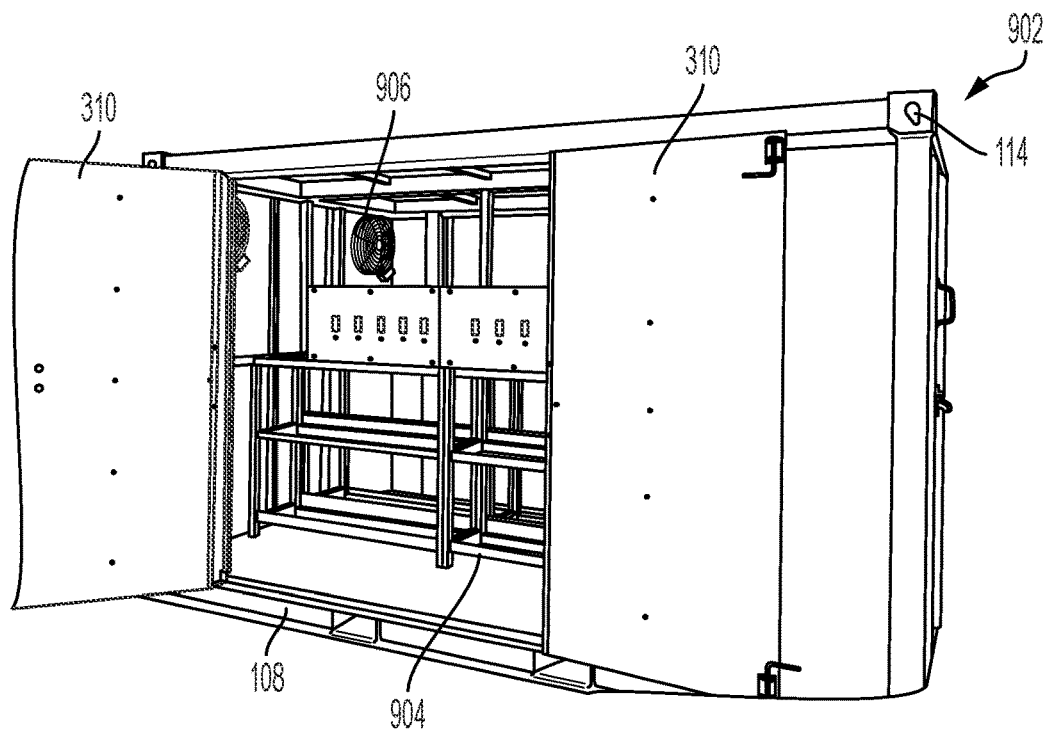
FIG. 9B is a perspective view of a shorty version of a multipurpose relocatable structure with side doors open showing a battery charging build out according to various embodiments described below.
Figure 9C:
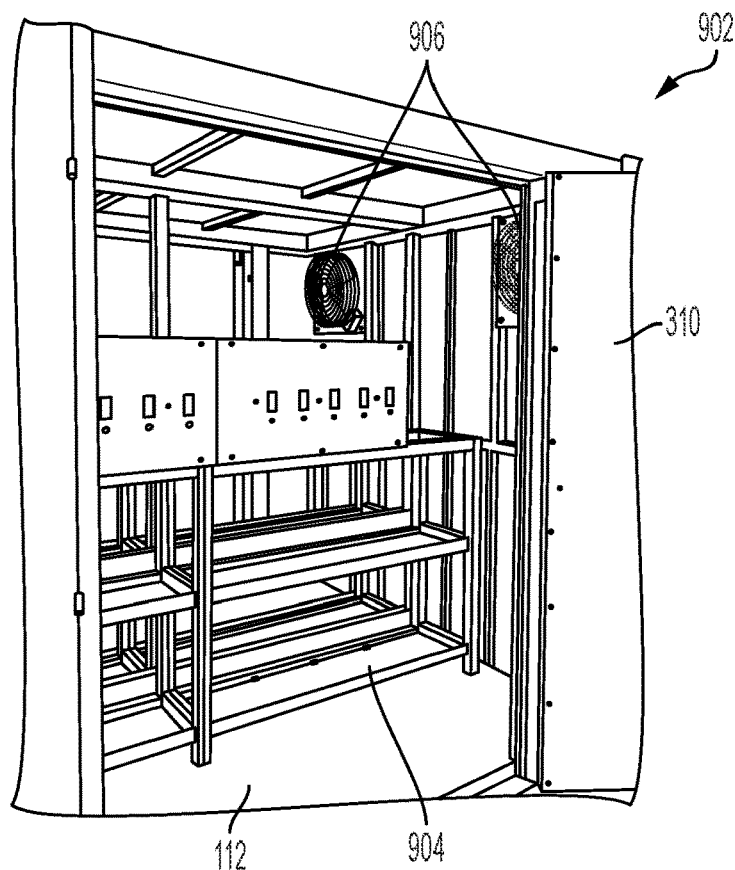
FIG. 9C is a perspective view of an interior of a shorty version of a multipurpose relocatable structure with side doors open showing a battery charging build out according to various embodiments described below.
Figure 9D:
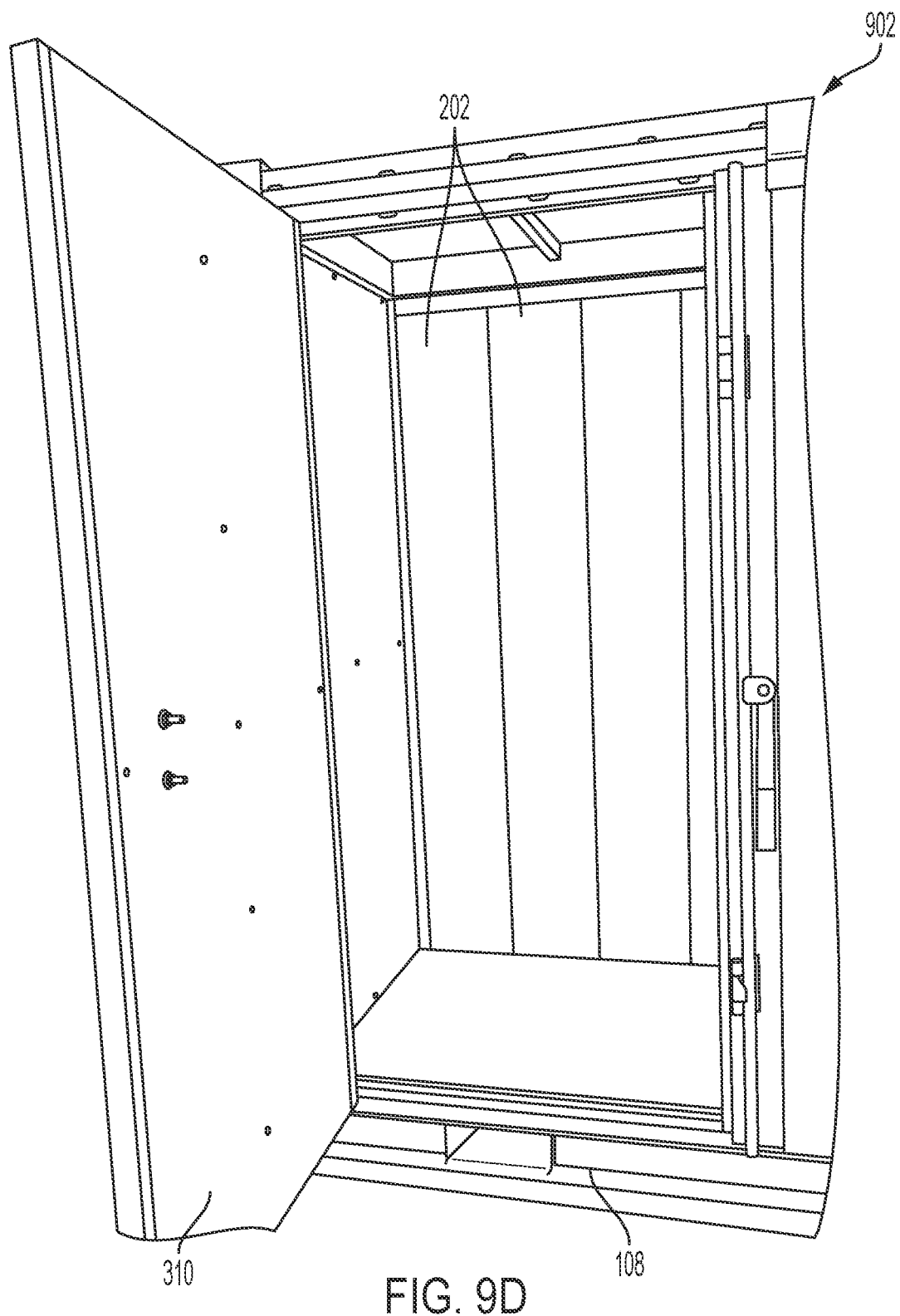
FIG. 9D is a front view of an interior of a shorty version of a multipurpose relocatable structure with an end door open according to various embodiments described below.
Figure 9E:
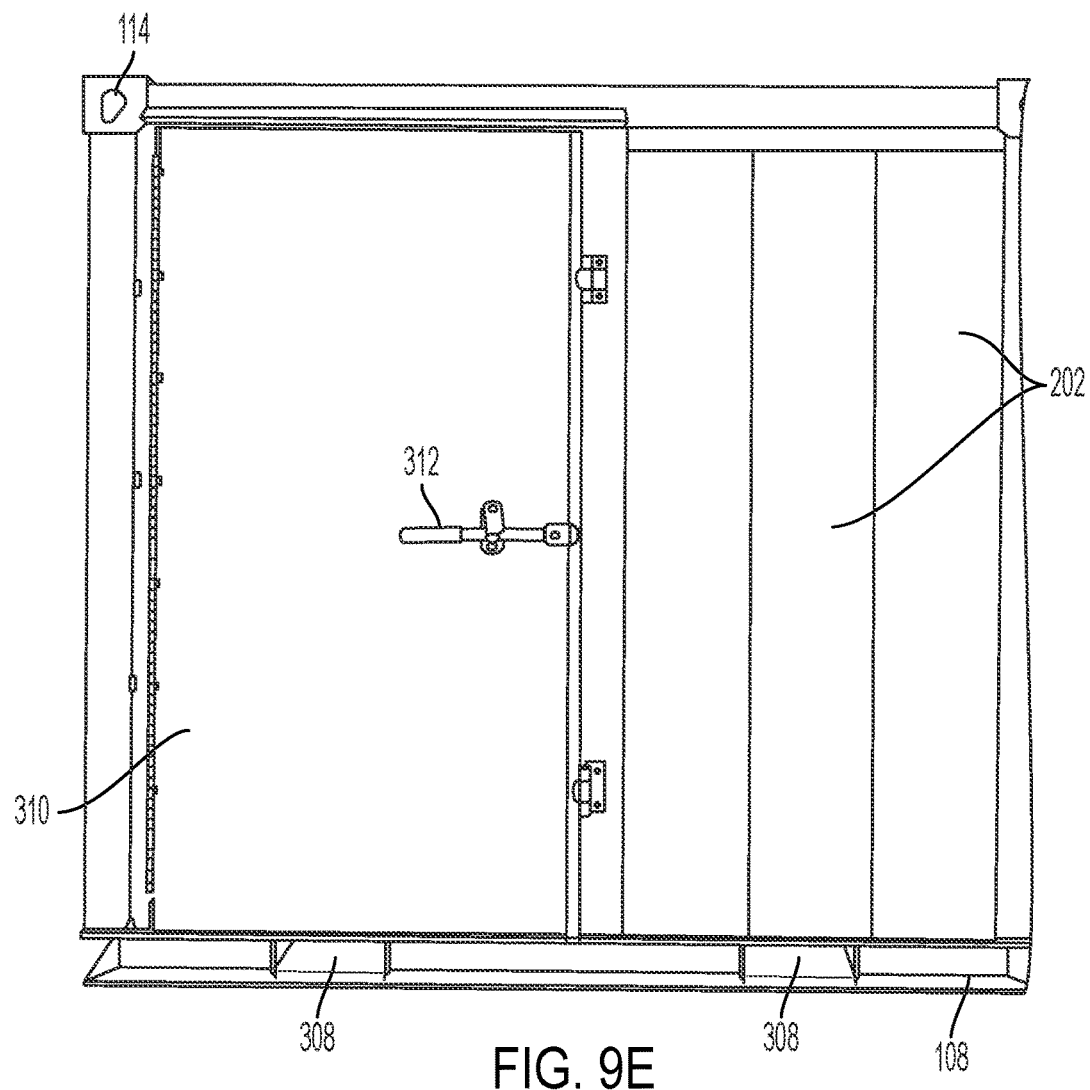
FIG. 9E is a front view of a shorty version of a multipurpose relocatable structure with an end door closed according to various embodiments described below.
Figure 9F:
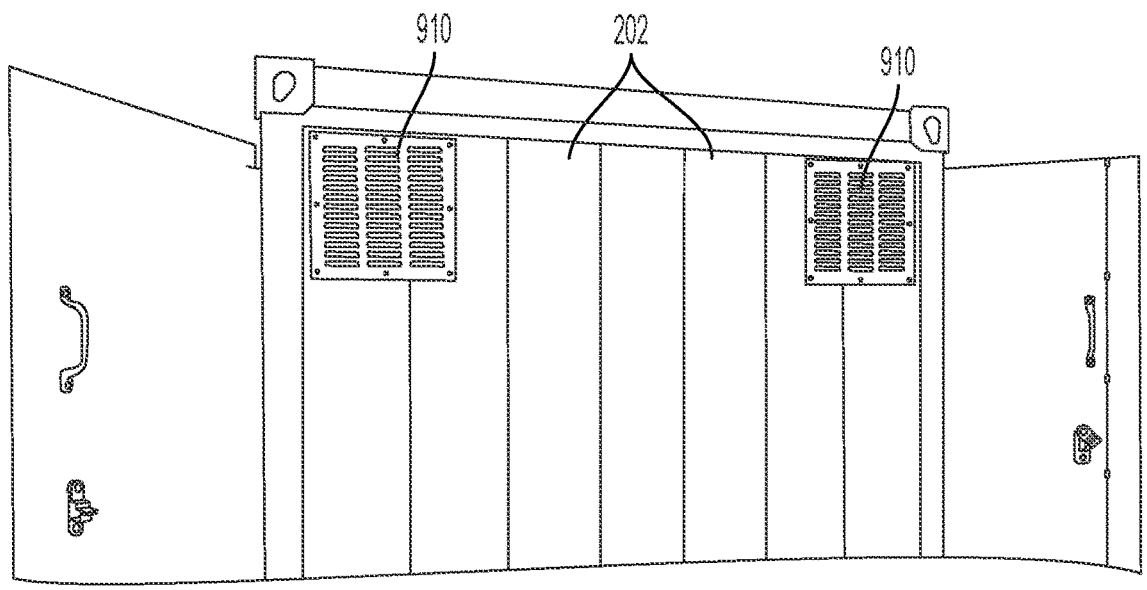
FIG. 9F is a rear view of a shorty version of a multipurpose relocatable structure according to various embodiments described below.

In this example configuration, the multipurpose relocatable structure 100 has double side doors 310 in the side of the structure, as well as an end door 310 on one end of the structure. Any number and positioning of doors 310 may be used without departing from the scope of this disclosure. As shown in the interior views of FIGS. 9B and 9C, the interior configuration 904 includes battery shelves and charging stations. The structure is configured with sufficient electrical power and corresponding connections suitable for the particular configuration, which in this example is for charging batteries. Any number and type of ventilation fans 906 may be mounted to the interior of the structure. Similarly, any number of vents 910 (as shown in FIG. 9F) may be placed within one or more walls 104 of the structure to facilitate airflow and cooling through the interior. FIG. 9D illustrates how panels 202 or other dividing mechanisms may be used to partition any portion of the interior of a structure as desired according to the specific implementation and needs of the structure.

Figure 10:
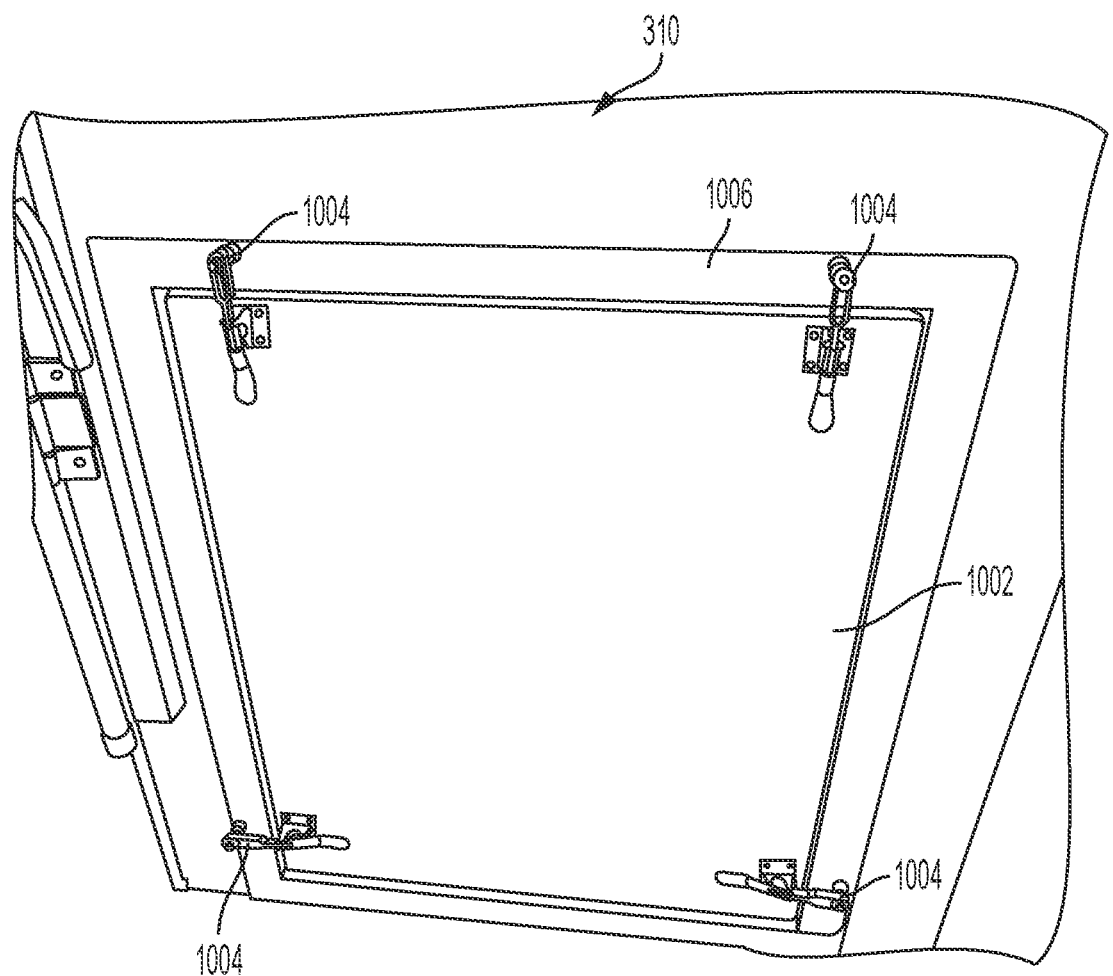
FIG. 10 is a front view of an emergency exit panel of a multipurpose relocatable structure according to various embodiments described below.
Figure 11:
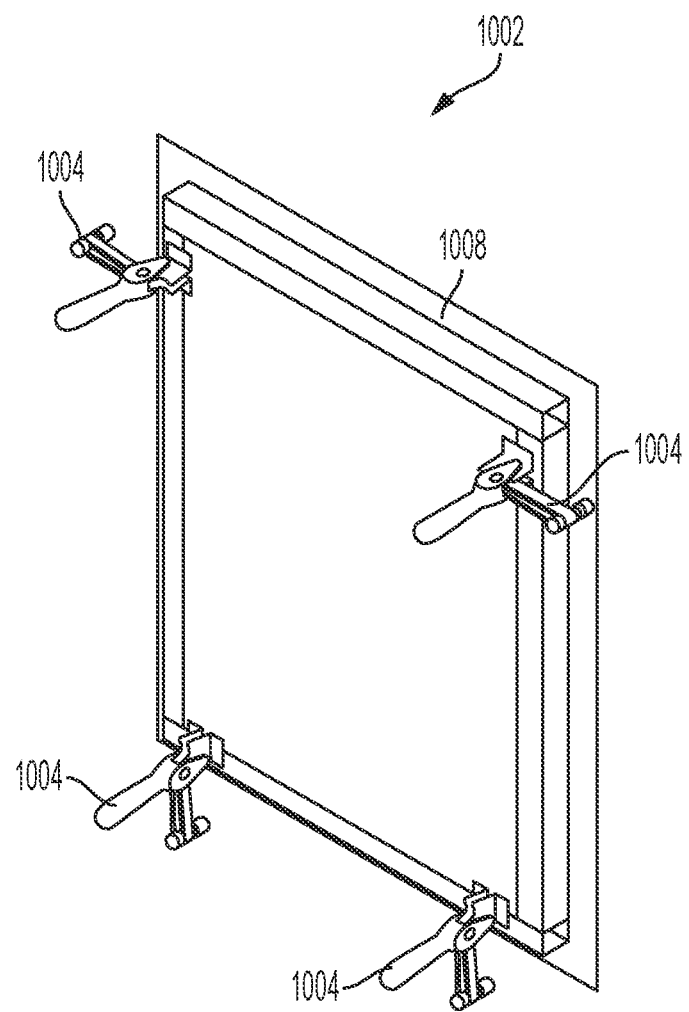
FIG. 11 is a rear perspective view of an emergency exit panel of a multipurpose relocatable structure according to various embodiments described below.
Figure 12:
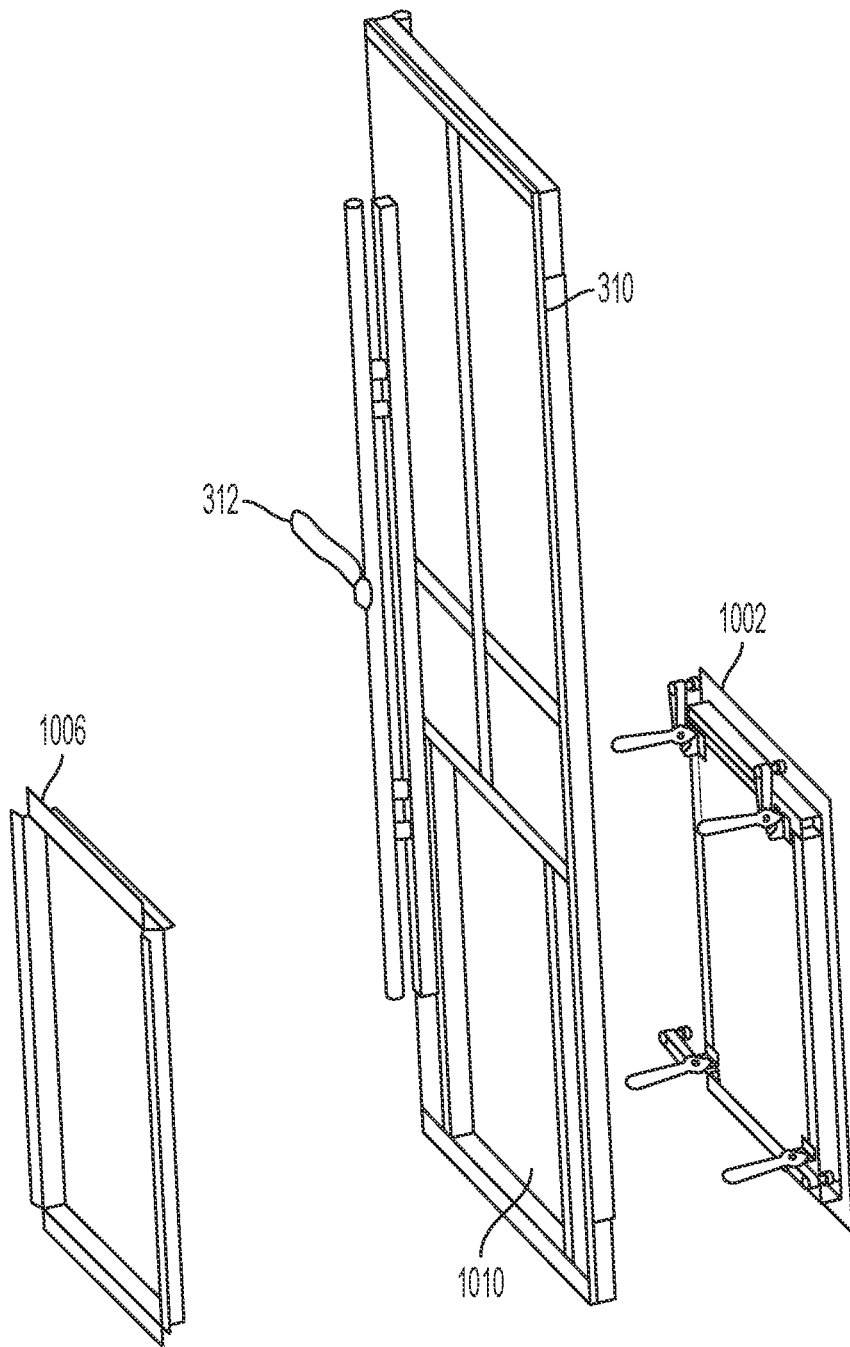
FIG. 12 is an exploded view of a door of a multipurpose relocatable structure showing an emergency exit panel according to various embodiments described below.

According to various embodiments, the multipurpose relocatable structure 100 may include one or more emergency escape hatches 314 within one or more doors 310 or walls 104. FIGS. 10-12 show various views of an emergency escape hatch 314. FIG. 10 shows an emergency escape hatch 314 installed within a door 310, as viewed from an interior of the multipurpose relocatable structure 100. In this example, the emergency escape hatch 314 has four release handles 1004 that, when pulled toward the user, are operative to disengage from a reinforced border 1006 of the door 310. After disengagement, the emergency escape hatch 314 may be pushed or kicked outward and through the door 310 to an exterior of the structure, providing an access hole 1010 (shown in FIG. 12) through which persons may egress the structure. FIG. 11 shows the emergency escape hatch 314 with the release handles 1004 pulled to disengage the corresponding latch mechanisms from the reinforced border 1006. Any number and type of release handles 1004 may be used without departing from the scope of this disclosure.

As shown in FIG. 11, the emergency escape hatch 314 has an exterior panel that is larger than the opening through the door 314, which results in an engagement surface 1008 that extends around the perimeter of the emergency escape hatch 314. FIG. 12 shows an exploded view of the door 314 and corresponding emergency escape hatch 314 and reinforced border 1006. The engagement surface 1008 abutting a surface of the exterior of the door 310 prevents the emergency escape hatch 314 from traversing through the access hole 1010 into the interior of the structure. The latch mechanisms operatively coupled to the release handles 1004 abut and apply a force to the reinforced border 1006 when the release handles 1004 are in an engaged configuration adjacent to an interior surface of the escape hatch, preventing the emergency escape hatch 314 from traversing through the access hole 1010 to the exterior of the structure. However, when the release handles are pulled inward toward the interior of the structure, the corresponding latch mechanisms release the force applied to the reinforced border 1006 and move inward, allowing the emergency escape hatch 314 to traverse through the access hole 1010 to the exterior of the structure and providing access to the access hole 1010 for egress.

Figure 13:
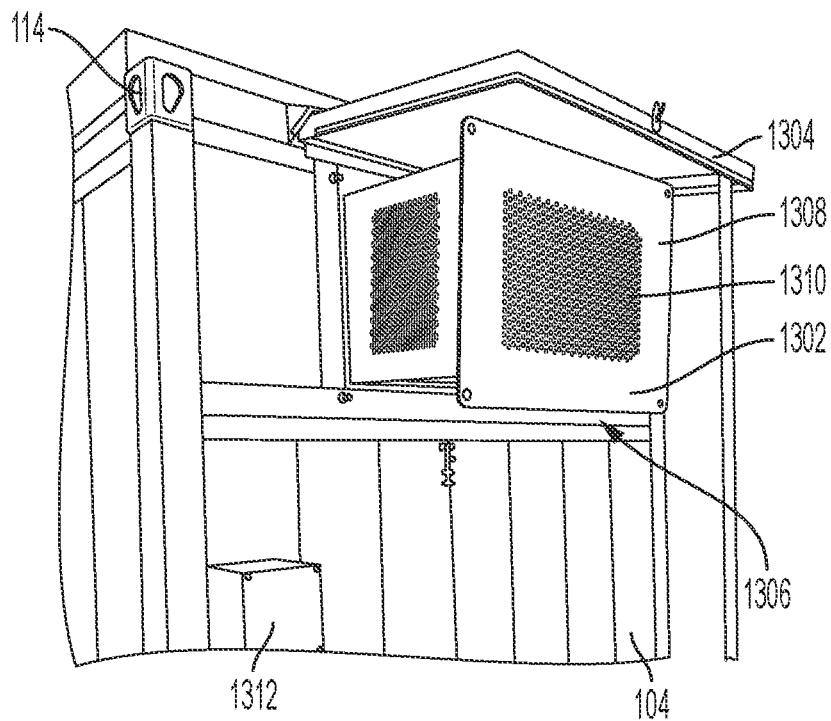
FIG. 13 is a rear perspective view of a multipurpose relocatable structure showing an environmental control unit (ECU) in an operational configuration according to various embodiments described below.
Figure 14:
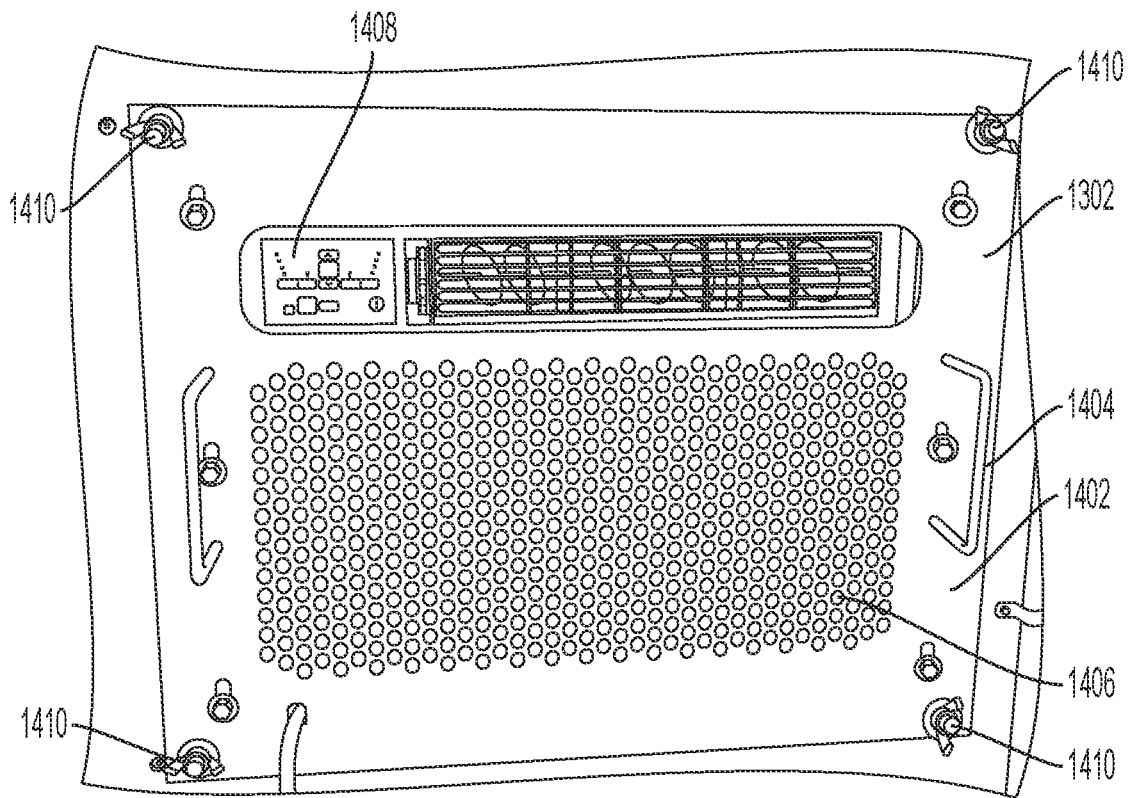
FIG. 14 is a close up view of an ECU from the interior of a multipurpose relocatable structure showing the ECU in the operational configuration according to various embodiments described below.
Figure 15:
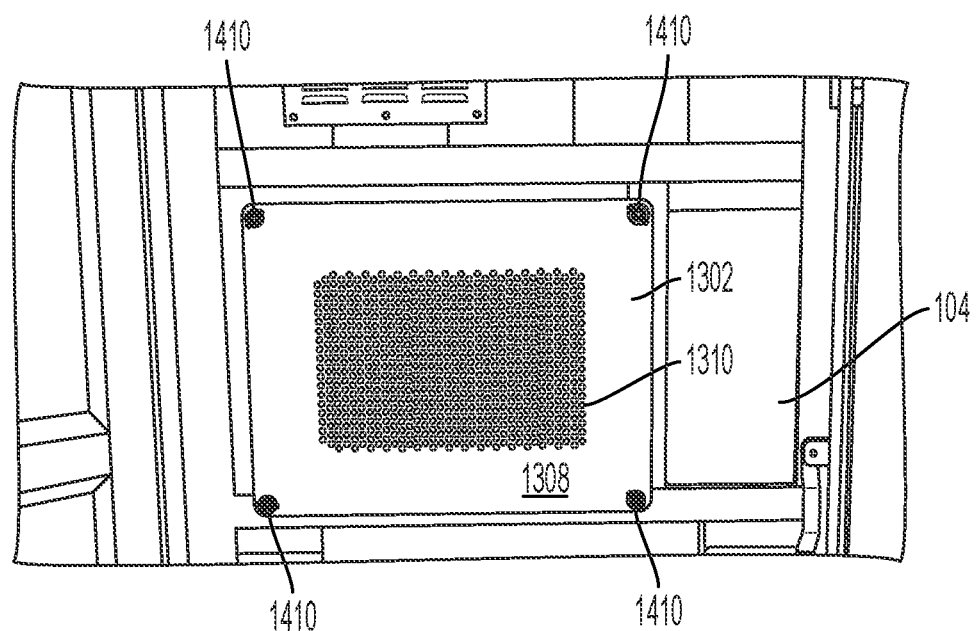
FIG. 15 is a close up view of an ECU from the exterior of a multipurpose relocatable structure showing the ECU in a transport configuration according to various embodiments described below.

Turning now to FIGS. 13-15, various configurations of an ECU system 1302 of a multipurpose relocatable structure 100 will be described. The multipurpose relocatable structure 100, and especially the shorty version, is configured to minimize any projection of components beyond an exterior plane of each wall, as defined by the lifting corners 114. In doing so, the multipurpose relocatable structure 100 may be, placed in structures, transported, positioned abutting other structures and structures, and generally maneuvered without fear of damaging any components that project outward from the structure. One corresponding feature of the multipurpose relocatable structure 100 that maximizes the interior volume of the structure during use while minimizing the exterior footprint for transport includes the reconfigurable ECU system 1302.

FIG. 13 is a rear perspective view of a multipurpose relocatable structure 100 showing an ECU system 1302 in an operational configuration. The ECU system 1302 includes an ECU that is slideable to extend substantially within the structure for transport, and to extend from the exterior wall 104 for operational use. In the operational configuration shown in FIG. 13, the ECU system 1302 extends outward from an exterior wall 104 such that the ECU system 1302 is substantially positioned on the outside of the structure while fluidly coupled to the interior. According to one embodiment, a protective cover 1304 may rotate upward to an open position in which the ECU system 1302 is substantially covered from above to protect from rain and the elements. When the ECU system 1302 is not present or in a transport configuration, the protective cover 1304 may be rotated downward to cover the ECU system 1302 or the aperture receiving the ECU system 1302. The ECU system 1302 has an outer plate 1308 that has an inlet 1310 for receiving external air. The outer plate 1308 has an outer border 1306 that is sized to abut the wall 104 of the structure when positioned in the transport configuration.

FIG. 14 shows the ECU system 1302 from the interior of the structure when the ECU is configured in the operational configuration in which the ECU system 1302 projects outward from the exterior wall 104 as shown in FIG. 13. An inner plate 1402 abuts the inside surface of the wall 104, which has bolts that extend through the inner plate 1402 to receive wingnuts 1410 for securing the ECU system 1302 in the operational configuration. Handles 1404 extend from the inner plate 1402 for gripping while reconfiguring the ECU system 1302 between operational and transport configurations. The inner plate 1402 has an outlet 1406 for routing conditioned air from the ECU system 1302 to the interior of the structure. Controls 1408 allow for the user to adjust the characteristics of the conditioned air from the ECU system 1302.

FIG. 15 shows the ECU system 1302 from the exterior of the structure when the ECU is configured in the transport configuration. In this configuration, the ECU system 1302 is substantially positioned within the interior volume of the structure such that the outer plate 1308 abuts the outside of the wall 104 of the structure and is secured in place via wingnuts 1410. In this transport configuration, the ECU system 1302 is substantially positioned within the structure and protected from damage. Any type of known rails or sliding mechanism may be used to facilitate movement between the operational and transport configurations, as well as to support the ECU system 1302 as it extends from a wall.

As discussed briefly above, the multipurpose relocatable structure 100 provides substantial lifting and tie down capabilities. Specifically, the lifting corners 114 of the multipurpose relocatable structure 100 provide a mechanism by which the multipurpose relocatable structure 100 may be readily attached to a crane or other lifting vehicle or device, or used as tie down anchors for securing the structure to a vehicle. According to one example, the lifting corners 114 are structurally robust enough to provide, along with the structural characteristics of the multipurpose relocatable structure 100 itself, a load capacity of approximately 8,250 pounds, with a safety factor of 3.2. These features significantly increase the lifting capacity of the multipurpose relocatable structure 100.

Figure 16:
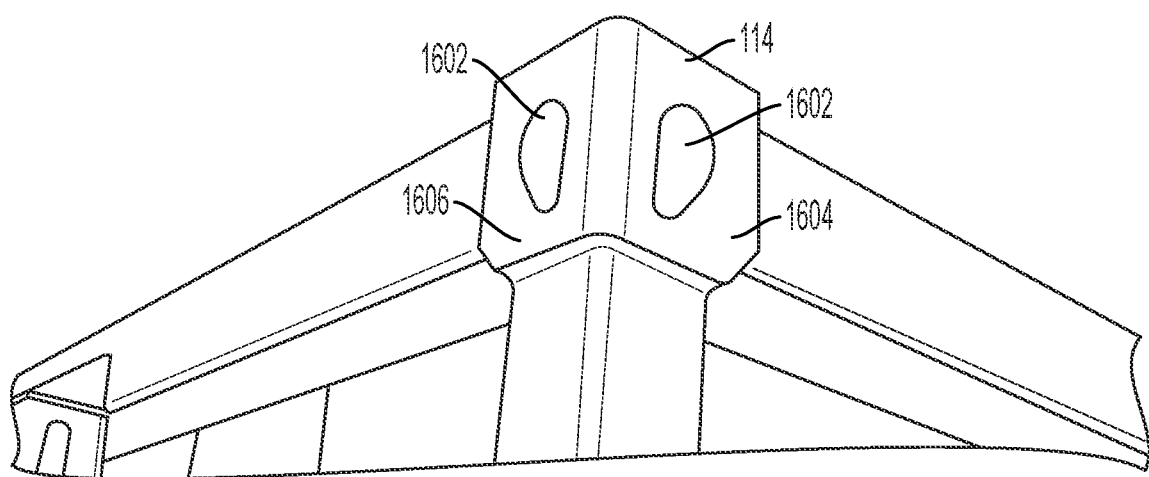
FIG. 16 is a close up perspective view of a lifting corner of a multipurpose relocatable structure according to various embodiments described below.
Figure 17:
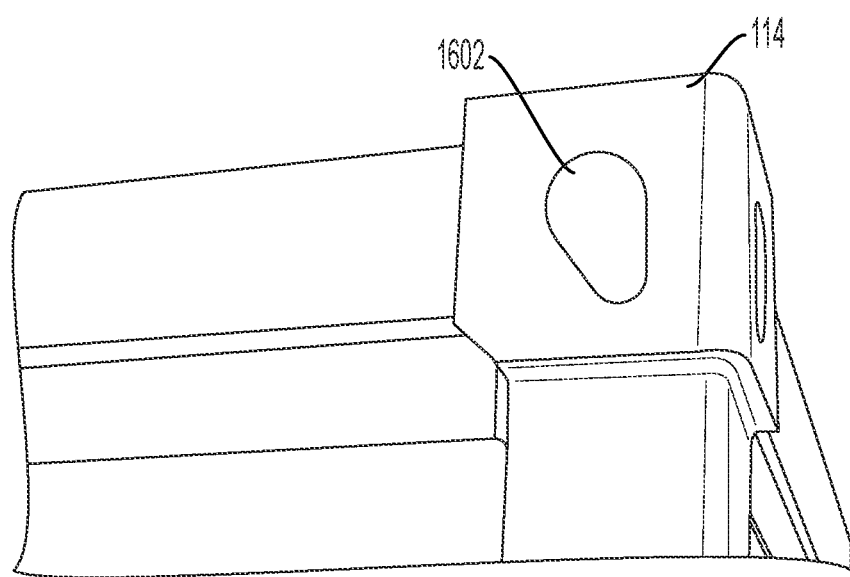
FIG. 17 is a close up side view of a lifting corner of a multipurpose relocatable structure according to various embodiments described below.

FIGS. 16 and 17 show a close up perspective view and a side view, respectively, of a lifting corner 114. According to this embodiment, the lifting corner 114 includes a first face 1604 and a second face 1606. The first face 1604 is substantially parallel with a first plane defined by a first wall of the structure. The second face 1606 is substantially parallel with a second plane defined by a second wall of the structure that is adjacent to the first wall. For example, the first face 1604 may be facing an end wall of the structure and the second face 1606 is facing a side wall that is separated from the end wall by a corner post 602. In this manner, the first face 1604 defines the first plane that is substantially normal to the second plane defined by the second face 1606. According to one embodiment, the lifting corner 114 may include 3 pieces of ½ inch or other suitable steel, including a solid top face, the first face 1604, and the second face 1606.

Figure 18A:
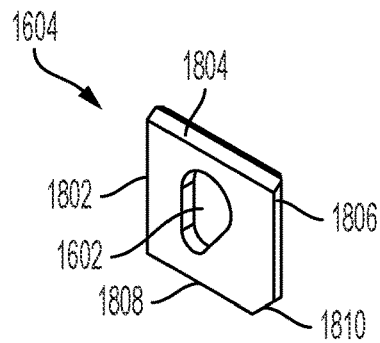
FIG. 18A is a perspective view of a first face of a lifting corner of a multipurpose relocatable structure according to various embodiments described below.
Figure 18B:
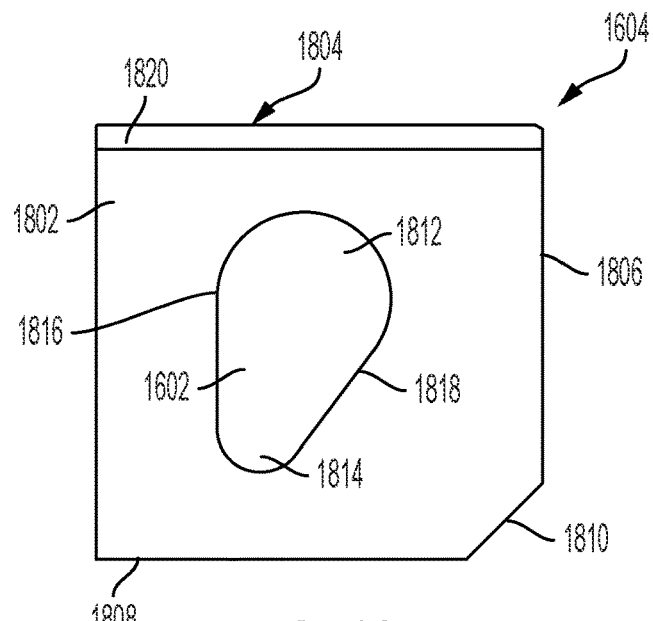
FIG. 18B is a front view of a first face of a lifting corner of a multipurpose relocatable structure according to various embodiments described below.
Figure 18C:
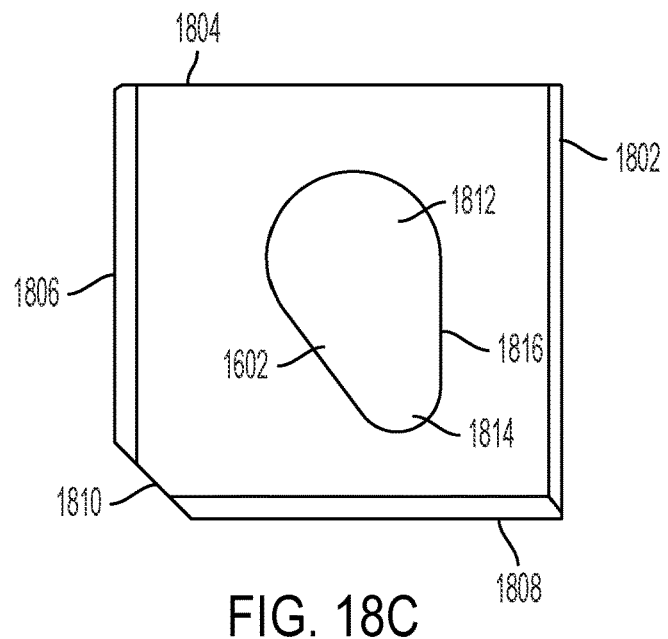
FIG. 18C is a rear view of a first face of a lifting corner of a multipurpose relocatable structure according to various embodiments described below.

Each of the first face 1604 and the second face 1606 includes a securement aperture 1602 that allows for a chain, hook, and/or other tie-down or lifting mechanism to pass through or to attach to. FIGS. 18A-18C show perspective, front, and rear views, respectively, of a first face 1604 of a lifting corner 114 according to various embodiments. One with ordinary skill in the art would recognize that the second face 1606 comprises identical features, but configured for attachment to the first face 1604 and other components of the lifting corner 114 and structure as shown in the figures and described herein.

The first face 1604 includes a front edge 1802, a top edge 1804, a rear edge 1806, a bottom edge 1808, and a chamfered corner 1810. The front edge 1802 is chamfered or angled to mate with a corresponding front edge of a second face 1606. The front edge 1802 may be formed or cut with an approximately 45 degree angle so that when the two faces are mated, they form an approximately 90 degree angle around the corner of the structure. Similarly, the top edge 1804 may be chamfered to mate with a corresponding edge of a top face of the lifting corner 114. The rear edge 1806 and the bottom edge 1808 may be chamfered as desired according to the weld or attachment mechanism to the upper end posts 604, upper side posts 606, and corner posts 602. The chamfered corner 1810 may be chamfered or alternatively be substantially squared off.

The securement aperture 1602 provides a unique means for providing a lifting and tie-down mechanism for the structure. The securement aperture 1602 is defined by a first circular opening 1812 and a second circular opening 1814 connected by tangential cuts to create a front aperture edge 1816 and a rear aperture edge 1818. Specifically, according to one embodiment, the radius of the first circular opening 1812 is two times the radius of the second circular opening 1814. The circular openings are positioned to provide a front aperture edge 1816 that is substantially vertical. The rounded edges of the securement aperture 1602 distributes the stress and forces applied to the lifting corner 114. The first circular opening 1812 is larger to receive and accommodate a hook, chain, and/or other lifting or securing device, while the second circular opening 1814 facilitates receipt and attachment of the lifting or securing device while minimizing the opening to maximize the strength of the lifting corner 114.

FIGS. 19A and 19B show front and rear views, respectively, of a top face 1900 of a lifting corner 114 of a multipurpose relocatable structure 100. The front view would be visible from within the lifting corner 114 looking upward. The rear view would be visible from the top of the lifting corner 114 looking downward on the top face 1900. The top face 1900 has a first face edge 1902 configured for coupling to the top edge 1804 of the first face 1604. The top face 1900 has a second face edge 1904 configured for coupling to the top edge of the second face 1606. A third edge 1906 and a fourth edge 1908 face the ceiling pan 110 and meet at a chamfered corner 1910.

The configuration of the securement aperture 1602 allows for a chain or strap (e.g., a conventional ⅜ inch chain and corresponding hook) to be threaded through both securement apertures 1602 of a single lifting corner 114 and secured to itself. Alternatively, a hook or component on a chain or strap may be hooked into or otherwise attached to a securement aperture 1602 of a lifting corner 114, particularly when tying the structure down to a vehicle. A chain or ratchet strap may also be secured to the bed of a vehicle, passed through the securement aperture 1602 in the first face 1604, threaded out of the securement aperture 1602 of the second face 1606, and secured to the bed of the vehicle.

According to one example, the front edge 1802 is approximately 5 inches in length and the top edge 1804 is approximately 5.15 inches in length. The center of the second circular opening 1814 is approximately 1.5 inches from the bottom edge 1808, and the center of the first circular opening 1812 is approximately 1.5 inches above the center of the second circular opening 1814. The first face 1604, the second face 1606, and the top face 1902 may each be manufactured from 0.5 inch steel plate. It should be appreciated that any suitable thicknesses and dimensions of the lifting corners 114 and corresponding components may be used without departing from the scope of this disclosure.

Figure 20:
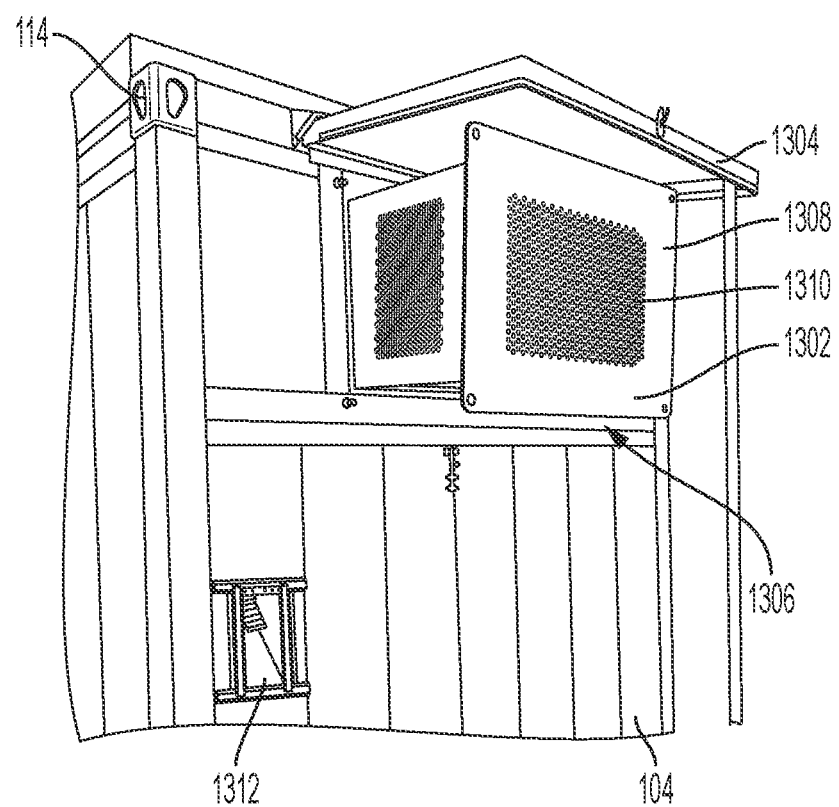
FIG. 20 is a front perspective view of a protected electrical connector on a multipurpose relocatable structure according to various embodiments described below.
Figure 21:
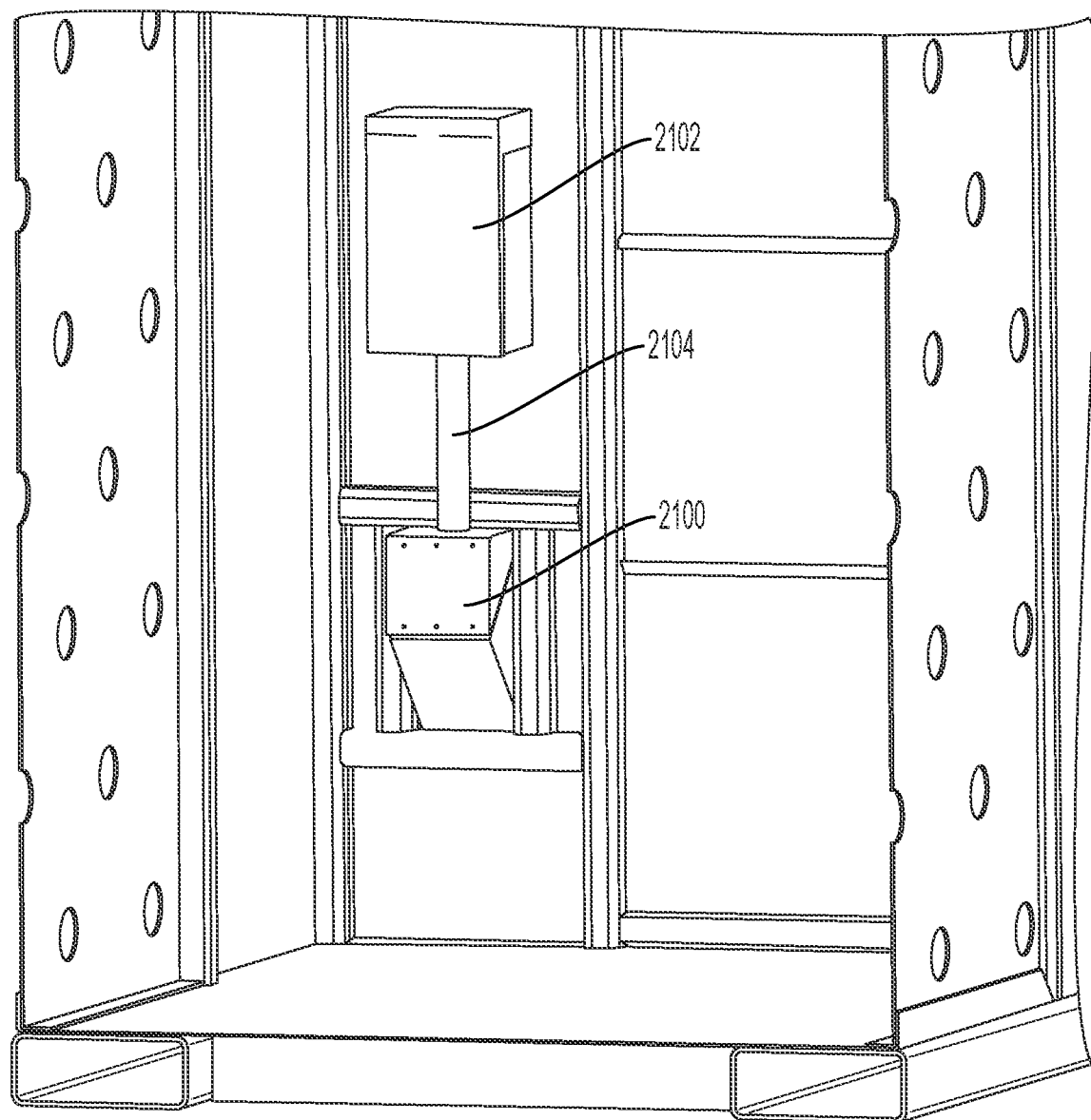
FIG. 21 is a rear perspective view of a protected electrical connector on a multipurpose relocatable structure according to various embodiments described below.
Figure 22:
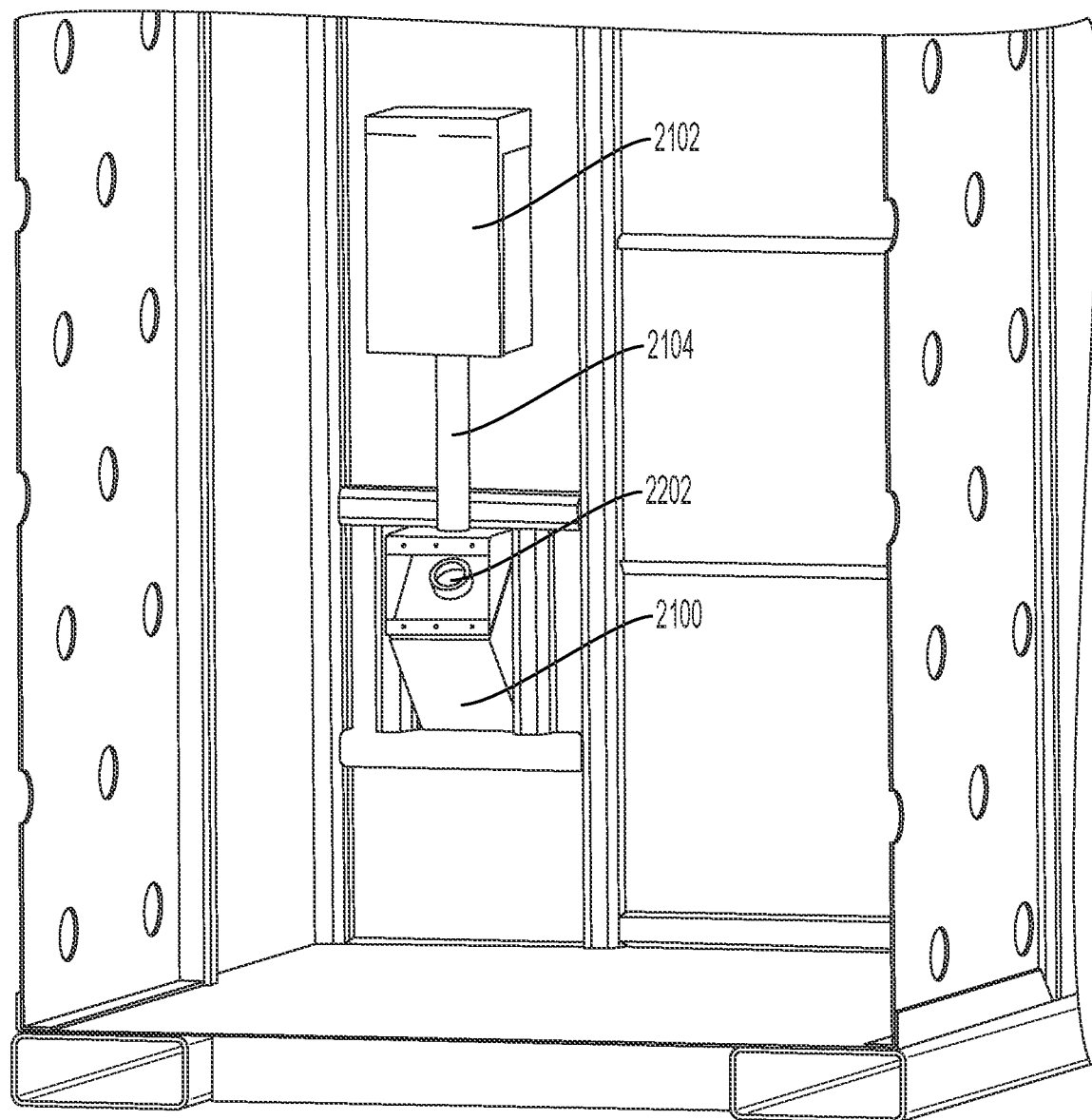
FIG. 22 is a rear perspective view of a protected electrical connector with a portion of a housing removed according to various embodiments described below.

FIGS. 20-22 show various views of a protected electrical connector 1312 that is used to electrically connect the multipurpose relocatable structure and interior circuitry to an external power source, such as a generator or a power grid. According to one embodiment, the protected electrical connector 1312 is utilized with the shorty structure 902. Conventional designs often include power inlets that include hardware that is mounted to the exterior of the structure. In doing so, the electrical connector projects outward from the wall of the structure, subjecting the connector to damage caused by impact with a vehicle or other structure during deployment. However, the protected electrical connector 1312 disclosed herein provides for a recessed connector that does not project outward from the wall 104. Rather, as shown in FIG. 20, the protected electrical connector 1312 is positioned within a wall 104 between a plane defined by an external surface of the wall and an interior of the multipurpose relocatable structure 100. The interface that mates with the external electrical connector from the power source is configured at an angle with respect to the plane defined by the external surface of the wall 104. By angling the interface and recessing the protected electrical connector 1312, the connector is protected from impact damage, yet accessible for quick and easy hook up and disconnect to and from an external power source.

FIG. 21 shows an interior view of the structure, showing a rear side 2100 of the protected electrical connector 1312. FIG. 22 shows the rear side 2100 of the protected electrical connector 1312 with a plate or portion 2100 of the connector housing removed to show the back side of the interface where electrical wires (not shown) route electricity from the external electrical connector through a wire conduit 2104 to a circuit breaker 2102.

CONCLUSION

Many modifications and other embodiments of the disclosure will come to mind to one skilled in the art to which this disclosure pertains having the benefit of the teachings presented in the foregoing descriptions and the associated drawings. For example, as will be understood by one skilled in the relevant field in light of this disclosure, the embodiments may take form in a variety of different mechanical and operational configurations. Therefore, it is to be understood that the disclosure is not to be limited to the specific embodiments disclosed herein, and that the modifications and other embodiments are intended to be included within the scope of the appended exemplary concepts. Although specific terms are employed herein, they are used in a generic and descriptive sense only and not for the purposes of limitation.

I claim:

1. A multipurpose relocatable structure, the system comprising:
   a floor system;
   a framework secured to the floor system, the framework comprising
      a plurality of corner posts,
      a pair of upper end posts,
      a pair of upper side posts,
      a plurality of horizontal support members positioned between the plurality of corner posts,
      a plurality of vertical support members traversing the plurality of horizontal support members between the pair of upper side posts and the floor system, and
      a plurality of ceiling supports positioned between the pair of upper side posts or the pair of upper end posts;
   a ceiling pan secured to the plurality of ceiling supports; and a plurality of walls secured to the framework, each wall comprising a plurality of panels, each panel secured to at least one adjacent panel along a vertical edge.

2. The multipurpose relocatable structure of claim 1, wherein the floor system comprises:
a plurality of side beams;
a plurality of end beams;
a plurality of treadplate support members;
a plurality of perimeter treadplate support members; and
a treadplate secured to the plurality of treadplate support members and the plurality of perimeter treadplate support members,
wherein the plurality of side beams and the plurality of end beams are configured in a substantially rectangular configuration, and
wherein the plurality of perimeter treadplate support members and the plurality of treadplate support members are secured to the plurality of side beams and to the plurality of end beams.

3. The multipurpose relocatable structure of claim 2, wherein the plurality of side beams and the plurality of end beams comprise wide-flanged beams.

4. The multipurpose relocatable structure of claim 3, wherein the floor system further comprises at least two conduits, each conduit having a substantially rectangular cross-section, configured to provide at least two forklift apertures for moving the multipurpose relocatable structure.

5. The multipurpose relocatable structure of claim 1, further comprising:
a door positioned in an end wall of the plurality of walls, the door comprising an access hole sized to allow a person to egress through the access hole;
an emergency escape hatch positioned within the door, the emergency escape hatch comprising:
a body portion sized to substantially fill the access hole in the door;
an engagement surface positioned on an exterior side of the body portion of the emergency escape hatch and sized to abut an exterior surface of the door when the body portion is positioned within the access hole such that the engagement surface prevents the emergency escape hatch from traversing through the access hole to an interior of the multipurpose relocatable structure; and
a plurality of release handles operatively coupled to a plurality of latch mechanisms positioned on an interior side of the body portion,
wherein the plurality of latch mechanisms are configured to engage an interior surface of the door when the body portion is positioned within the access hole and the latch mechanisms are engaged such that the plurality of latch mechanisms prevent the emergency escape hatch from traversing through the access hole to an exterior of the multipurpose relocatable structure, and
wherein the plurality of latch mechanisms are configured to disengage the interior surface of the door in response to movement of the plurality of release handles to allow the emergency escape hatch to traverse through the access hole to the exterior of the multipurpose relocatable structure.

6. The multipurpose relocatable structure of claim 1, wherein the multipurpose relocatable structure comprises an interior configured for battery charging and storage, the interior comprising:
a plurality of shelves sized to receive a plurality of batteries; and
a plurality of electrical connections positioned at a plurality of positions of the plurality of shelves, each electrical connection configured to attach to a battery of the plurality of batteries and to deliver an electrical signal from an external power source to the battery.

7. The multipurpose relocatable structure of claim 1, further comprising:
an end door positioned within an end wall of the plurality of walls; and
double side doors positioned within a side wall of the plurality of walls.

8. The multipurpose relocatable structure of claim 1, wherein the plurality of walls are less than 90 in height.

9. The multipurpose relocatable structure of claim 1, further comprising an environmental control unit (ECU) system that is selectively configurable between a transport configuration in which the ECU system is substantially positioned within an interior of the multipurpose relocatable structure and an operational configuration in which the ECU system is substantially positioned outside of the multipurpose relocatable structure while fluidly coupling external air to the interior.

10. The multipurpose relocatable structure of claim 9, wherein the ECU system comprises a sliding mechanism configured to slide the ECU system toward the interior of the multipurpose relocatable structure to the transport configuration in which an outer plate of the ECU system abuts an exterior wall of the multipurpose relocatable structure, and to slide the ECU system away from the interior of the multipurpose relocatable structure to the operational configuration in which the outer plate of the ECU system extends a distance from the exterior wall of the multipurpose relocatable structure.

11. The multipurpose relocatable structure of claim 1, further comprising a protected electrical connector configured to receive an external electrical connector from an external power source and to provide electricity to an internal circuit breaker, the protected electrical connector positioned within a wall between a plane defined by an external surface of the wall and an interior of the multipurpose relocatable structure.

12. The multipurpose relocatable structure of claim 11, wherein the protected electrical connector comprises an interface configured at an angle with respect to the plane, the interface configured to mate with the external electrical connector.

13. The multipurpose relocatable structure of claim 1, further comprising a plurality of lifting and tie down corners, each lifting corner comprising:
a securement aperture defined by a first circular opening and a second circular opening connected by tangential cuts to create a front aperture edge and a rear aperture edge,
wherein a first radius of the first circular opening is larger than a second radius of the second circular opening.

14. A multipurpose relocatable structure, comprising:
a floor system;
a framework secured to the floor system;
a ceiling pan secured to the framework;
a plurality of walls secured to the framework, each wall comprising a plurality of panels, each panel secured to at least one adjacent panel along a vertical edge;
a door positioned in an end wall of the plurality of walls, the door comprising an access hole sized to allow a person to egress through the access hole;
an emergency escape hatch positioned within the access hole of the door, the emergency escape hatch releasable from an interior of the multipurpose relocatable structure and configured to be pushed outward to an exterior of the multipurpose relocatable structure after being released; and a protected electrical connector configured to receive an external electrical connector from an external power source and to provide electricity to an internal circuit breaker, the protected electrical connector positioned within a wall of the plurality of walls between a plane defined by an external surface of the wall and the interior of the multipurpose relocatable structure.

15. The multipurpose relocatable structure of claim 14, wherein the framework comprises:
   a plurality of corner posts;
   a pair of upper end posts;
   a pair of upper side posts;
   a plurality of horizontal support members positioned between the plurality of corner posts,
   a plurality of vertical support members traversing the plurality of horizontal support members between the pair of upper side posts and the floor system; and
   a plurality of ceiling supports positioned between the pair of upper side posts or the pair of upper end posts.

16. The multipurpose relocatable structure of claim 14, wherein each panel comprises a cross section having:
   a first substantially vertical member positioned on a first edge of the panel and extending away from a substantially horizontal front face of the panel;
   a first substantially horizontal member extending toward a center of the panel from the first substantially vertical member to form a substantially L-shaped configuration;
   a second substantially vertical member positioned on a second edge of the panel opposite the first edge and extending away from the substantially horizontal front face of the panel; and
   a second substantially horizontal member extending away from the center of the panel from the second substantially vertical member to form a substantially backwards L-shaped configuration,
   wherein the first edge of the panel is configured to nest within the second edge of an adjacent panel for coupling.

17. The multipurpose relocatable structure of claim 14, further comprising an ECU system that is selectively configurable between a transport configuration in which the ECU system is substantially positioned within an interior of the multipurpose relocatable structure and an operational configuration in which the ECU system is substantially positioned outside of the multipurpose relocatable structure while fluidly coupling external air to the interior,
   wherein the ECU system comprises a sliding mechanism configured to slide the ECU system toward the interior of the multipurpose relocatable structure to the transport configuration in which an outer plate of the ECU system abuts an exterior wall of the multipurpose relocatable structure, and to slide the ECU system away from the interior of the multipurpose relocatable structure to the operational configuration in which the outer plate of the ECU system extends a distance from the exterior wall of the multipurpose relocatable structure.

18. The multipurpose relocatable structure of claim 14, wherein the protected electrical connector comprises an interface configured at an angle with respect to the plane, the interface configured to mate with the external electrical connector.

19. The multipurpose relocatable structure of claim 14, wherein the emergency escape hatch comprises:
   a body portion sized to substantially fill the access hole in the door;
   an engagement surface positioned on an exterior side of the body portion of the emergency escape hatch and sized to abut an exterior surface of the door when the body portion is positioned within the access hole such that the engagement surface prevents the emergency escape hatch from traversing through the access hole to an interior of the multipurpose relocatable structure; and
   a plurality of release handles operatively coupled to a plurality of latch mechanisms positioned on an interior side of the body portion,
   wherein the plurality of latch mechanisms are configured to engage an interior surface of the door when the body portion is positioned within the access hole and the latch mechanisms are engaged such that the plurality of latch mechanisms prevent the emergency escape hatch from traversing through the access hole to an exterior of the multipurpose relocatable structure, and
   wherein the plurality of latch mechanisms are configured to disengage the interior surface of the door in response to movement of the plurality of release handles to allow the emergency escape hatch to traverse through the access hole to the exterior of the multipurpose relocatable structure.

20. A multipurpose relocatable structure, comprising:
   a framework secured to a floor system;
   a plurality of walls secured to the framework, each wall comprising a plurality of panels, each panel comprising:
      a first substantially vertical member positioned on a first edge of the panel and extending away from a substantially horizontal front face of the panel;
      a first substantially horizontal member extending toward a center of the panel from the first substantially vertical member to form a substantially L-shaped configuration;
      a second substantially vertical member positioned on a second edge of the panel opposite the first edge and extending away from the substantially horizontal front face of the panel; and
      a second substantially horizontal member extending away from the center of the panel from the second substantially vertical member to form a substantially backwards L-shaped configuration,
      wherein the first edge of the panel is configured to nest within the second edge of an adjacent panel for coupling;
   a protected electrical connector configured to receive an external electrical connector from an external power source and to provide electricity to an internal circuit breaker, the protected electrical connector positioned within a wall of the plurality of walls between a plane defined by an external surface of the wall and the interior of the multipurpose relocatable structure.

* * * * *